United States Patent
Werner et al.

(10) Patent No.: US 12,279,227 B2
(45) Date of Patent: Apr. 15, 2025

(54) DEVICE LOCATION FINDING

(71) Applicant: Apple Inc., Cupertino, CA (US)

(72) Inventors: Benjamin A. Werner, San Jose, CA (US); Brent M. Ledvina, San Francisco, CA (US); Tunc Ertan, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/543,421

(22) Filed: Dec. 6, 2021

(65) Prior Publication Data

US 2022/0394660 A1 Dec. 8, 2022

Related U.S. Application Data

(60) Provisional application No. 63/197,228, filed on Jun. 4, 2021.

(51) Int. Cl.
| | |
|---|---|
| *H04W 64/00* | (2009.01) |
| *H04W 4/02* | (2018.01) |
| *H04W 4/029* | (2018.01) |

(52) U.S. Cl.
CPC ......... *H04W 64/006* (2013.01); *H04W 4/023* (2013.01); *H04W 4/027* (2013.01); *H04W 4/029* (2018.02)

(58) Field of Classification Search
CPC ....... H04W 4/029; H04W 64/00; H04W 4/02; H04W 64/003; H04W 12/126;
(Continued)

(56) References Cited

U.S. PATENT DOCUMENTS

| | | | |
|---|---|---|---|
| 4,918,425 A | 4/1990 | Greenberg et al. | |
| 5,910,776 A | 6/1999 | Black | |
| | (Continued) | | |

FOREIGN PATENT DOCUMENTS

| | | |
|---|---|---|
| CN | 101682508 | 3/2010 |
| CN | 102325324 A | 1/2012 |
| | (Continued) | |

OTHER PUBLICATIONS

PCT/US2019/048899, "Notification of Transmittal of the International Search Report and the Written Opinion of the International Searching Authority, or The Declaration" dated Dec. 2, 2019, 5 pgs.
(Continued)

*Primary Examiner* — Kwasi Karikari
(74) *Attorney, Agent, or Firm* — Kilpatrick Townsend & Stockton LLP

(57) ABSTRACT

Embodiments for a device locator application are described. In an embodiment, one or more inertial displacement measurement values may be received using the inertial sensor and received camera sensor data, a trajectory based on the one or more inertial displacement measurement values may be determined, a beacon signal from a target wireless device and determine at least one signal strength value from the beacon signal may be received, at least one proximity value to the target wireless device may be estimated based on the at least one signal strength value corresponding to at least one position along the trajectory, and an indicator of the at least one proximity value to the target wireless device may be presented along the trajectory in a user interface.

20 Claims, 26 Drawing Sheets

(58) Field of Classification Search
CPC ..... H04W 4/025; H04W 88/02; H04W 92/18; H04W 12/63; H04W 12/30; H04W 4/026; H04W 4/023; H04W 4/80; H04W 72/21; H04W 8/005; H04W 4/027; H04W 4/38; H04W 40/20; H04W 48/04; H04W 52/0251; H04W 12/03

See application file for complete search history.

(56) References Cited

U.S. PATENT DOCUMENTS

| | | |
|---|---|---|
| 6,292,660 B1 | 9/2001 | Hartless et al. |
| 6,345,098 B1 | 2/2002 | Matyas, Jr et al. |
| 6,369,706 B1 | 4/2002 | Anderson et al. |
| 6,754,349 B1 | 6/2004 | Arthan |
| 6,993,350 B2 | 1/2006 | Katoh |
| 7,039,427 B2 | 5/2006 | Tachikawa |
| 7,059,182 B1 | 6/2006 | Ragner |
| 7,224,987 B1 | 5/2007 | Bhela et al. |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,519,377 B2 | 4/2009 | Tsukamoto |
| 7,558,529 B2 | 7/2009 | Seshadri et al. |
| 7,657,248 B2 | 2/2010 | Hodoshima |
| 8,213,389 B2 | 7/2012 | Bush et al. |
| 8,224,355 B2 | 7/2012 | Beydler et al. |
| 8,351,937 B2 | 1/2013 | Lee |
| 8,457,617 B2 | 6/2013 | Sweeney et al. |
| 8,499,337 B1 | 7/2013 | Kenny |
| 8,538,401 B2 | 9/2013 | Kim et al. |
| 8,583,915 B1 | 11/2013 | Huang |
| 8,873,758 B2 | 10/2014 | Bradley |
| 8,971,924 B2 | 3/2015 | Pai et al. |
| 9,009,794 B2 | 4/2015 | Dykeman et al. |
| 9,077,521 B2 | 7/2015 | Machani |
| 9,104,896 B2 | 8/2015 | Pai et al. |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,357,348 B2 | 5/2016 | Evans et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,439,056 B2 | 9/2016 | Chukka et al. |
| 9,443,366 B2 | 9/2016 | Rayner |
| 9,456,298 B2 | 9/2016 | Lee et al. |
| 9,462,109 B1 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,557,185 B2 | 1/2017 | Kimes |
| 9,565,255 B2 | 2/2017 | Kapoor et al. |
| 9,641,622 B2 | 5/2017 | Kapoor et al. |
| 9,706,032 B2 | 7/2017 | Pai et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,860,932 B2 | 1/2018 | Kapoor et al. |
| 9,922,531 B1 | 3/2018 | Doxey et al. |
| 9,961,507 B1 | 5/2018 | Mendelson |
| 10,015,836 B2 | 7/2018 | Kapoor et al. |
| 10,022,066 B2 | 7/2018 | Tomiha |
| 10,022,086 B1 | 7/2018 | Kahn et al. |
| 10,042,595 B2 | 8/2018 | Behzadi et al. |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2 | 6/2020 | Fiorini et al. |
| 10,771,898 B2 | 9/2020 | Dusan et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,051,105 B2 | 6/2021 | Dusan et al. |
| 11,088,830 B2 | 8/2021 | Gu et al. |
| 11,107,088 B2 | 8/2021 | Radocchia et al. |
| 11,202,168 B2 | 12/2021 | Evans et al. |
| 11,265,716 B2 | 3/2022 | Klinkner et al. |
| 11,282,351 B2 | 3/2022 | Ingrassia, Jr. et al. |
| 11,288,562 B2 | 3/2022 | Purba |
| 11,310,652 B2 | 4/2022 | Norp et al. |
| 11,356,799 B2 | 6/2022 | Haney |
| 11,595,784 B2 | 2/2023 | Mohalik |
| 11,606,669 B2 | 3/2023 | Lopatin et al. |
| 11,622,237 B2 | 4/2023 | Diem |
| 11,641,563 B2 | 5/2023 | Lopatin et al. |
| 11,716,603 B2 | 8/2023 | Lee et al. |
| 11,863,671 B1 | 1/2024 | Sierra et al. |
| 11,889,302 B2 | 1/2024 | Victa et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2004/0162027 A1 | 8/2004 | Chang |
| 2004/0249817 A1 | 12/2004 | Liu et al. |
| 2005/0021767 A1 | 1/2005 | Cai |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004798 A1 | 3/2008 | Troxler et al. |
| 2008/0119953 A1 | 5/2008 | Reed et al. |
| 2008/0120196 A1 | 5/2008 | Reed et al. |
| 2009/0058670 A1 | 3/2009 | Sweeney et al. |
| 2009/0150674 A1 | 6/2009 | Richardson et al. |
| 2009/0315767 A1 | 12/2009 | Scalisi et al. |
| 2009/0323972 A1* | 12/2009 | Kohno ............... H04L 9/0631 380/284 |
| 2009/0325599 A1 | 12/2009 | Vuori |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0289620 A1 | 11/2010 | Aminger et al. |
| 2011/0124326 A1 | 5/2011 | Kudo |
| 2012/0054493 A1 | 3/2012 | Bradley |
| 2012/0083209 A1 | 4/2012 | Giles et al. |
| 2012/0100868 A1 | 4/2012 | Kim et al. |
| 2012/0275361 A1 | 11/2012 | Berenberg et al. |
| 2012/0310391 A1 | 12/2012 | Sanders |
| 2012/0328061 A1 | 12/2012 | Chow |
| 2013/0023238 A1 | 1/2013 | Kaplan et al. |
| 2013/0034004 A1 | 2/2013 | Mannemala et al. |
| 2013/0104035 A1 | 4/2013 | Wagner et al. |
| 2013/0111555 A1 | 5/2013 | Leneel |
| 2013/0171986 A1 | 7/2013 | Shimizu |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2013/0290522 A1 | 10/2013 | Behm, Jr. |
| 2013/0343542 A1 | 12/2013 | Rosati et al. |
| 2014/0111307 A1 | 4/2014 | Ingrassia et al. |
| 2014/0222685 A1 | 8/2014 | Middleton et al. |
| 2014/0379584 A1 | 12/2014 | Ward |
| 2015/0019124 A1 | 1/2015 | Bandyopadhyay et al. |
| 2015/0072618 A1 | 3/2015 | Granbery |

(56) References Cited

U.S. PATENT DOCUMENTS

| | | |
|---|---|---|
| 2015/0189596 A1 | 7/2015 | Stephens |
| 2015/0277852 A1 | 10/2015 | Burgis |
| 2015/0289207 A1 | 10/2015 | Kubo et al. |
| 2015/0334569 A1 | 11/2015 | Rangarajan et al. |
| 2015/0350140 A1 | 12/2015 | Garcia et al. |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0037439 A1 | 2/2016 | Shamis et al. |
| 2016/0057572 A1 | 2/2016 | Bojorquez Alfaro et al. |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0087959 A1 | 3/2016 | Park |
| 2016/0088143 A1 | 3/2016 | Cohn et al. |
| 2016/0094947 A1 | 3/2016 | Shen et al. |
| 2016/0140335 A1 | 5/2016 | Proulx et al. |
| 2016/0017402 A1 | 6/2016 | Cavallaro et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0006417 A1 | 1/2017 | Canoy et al. |
| 2017/0078408 A1 | 3/2017 | Lepp et al. |
| 2017/0126818 A1 | 5/2017 | Kang |
| 2017/0127340 A1 | 5/2017 | Dooey et al. |
| 2017/0134898 A1* | 5/2017 | Vega ............ G01S 5/00 |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0288599 A1 | 10/2018 | Zhao et al. |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | Mclaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0069243 A1 | 2/2019 | Bean et al. |
| 2019/0116173 A1 | 4/2019 | Robison et al. |
| 2019/0124469 A1 | 4/2019 | Roy et al. |
| 2019/0191301 A1 | 6/2019 | Fang et al. |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1 | 4/2020 | Lopatin et al. |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daouta et al. |
| 2021/0334851 A1 | 10/2021 | Proctor, Jr. et al. |
| 2021/0400045 A1 | 12/2021 | Kondeti |
| 2022/0021684 A1 | 1/2022 | Mensah et al. |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0165139 A1 | 5/2022 | Ingrassia, Jr. et al. |
| 2022/0200789 A1 | 6/2022 | Lalande et al. |
| 2022/0224300 A1 | 7/2022 | Knode |
| 2022/0256633 A1 | 8/2022 | Gu et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |
| 2022/0394660 A1 | 12/2022 | Werner et al. |

FOREIGN PATENT DOCUMENTS

| | | |
|---|---|---|
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | H11262065 | 9/1999 |
| JP | 2007150904 | 6/2007 |
| JP | 2015507395 | 3/2015 |
| JP | 2018056773 | 4/2018 |
| JP | 2018191522 | 12/2018 |
| JP | 2021025798 | 2/2021 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 | 11/2010 |
| WO | 2012030733 | 3/2012 |
| WO | 2013036488 | 3/2013 |
| WO | 2013086056 | 6/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |

(56) References Cited

FOREIGN PATENT DOCUMENTS

| WO | 2022046527 | 3/2022 |
| WO | 2022256438 | 12/2022 |

OTHER PUBLICATIONS

A. Korolova et al., "Cross-App Tracking Via Nearby Bluetooth Low Energy Devices", A presentation proposal for PrivacyCon 2017, Published Mar. 13, 2018, 12 pgs.

PCT/US2020/028318, "PCT Notification of Transmittal of the International Search Report and the Written Opinion of the International Searching Authority, or the Declaration", dated Jul. 8, 2020, 16 pages.

PCT/US2020/028326, "PCT Notification of Transmittal of the International Search Report and the Written Opinion of the International Searching Authority, or the Declaration", dated Jul. 3, 2020, 12 pages.

PCT/US2020/028327, "PCT Notification of Transmittal of the International Search Report and the Written Opinion of the International Searching Authority, or the Declaration", dated Sep. 14, 2020, 17 pages.

PCT/US2020/028329, "PCT Notification of Transmittal of the International Search Report and the Written Opinion of the International Searching Authority, or the Declaration", dated Jul. 15, 2020, 13 pages.

Mannan, Mohammad, et al. "Mercury: Recovering forgotten passwords using personal devices." International Conference on Financial Cryptography and Data Security. Springer, Berlin, Heidelberg, 2011 (Year: 2011).

FOFA, "Find One, Find All Key Finder & Remote Control Locators", received from The Wayback Machine—https://web.archive.org/web/20200715080402/http://www.findonefindall.com:80/index.htm, 3 pages.

Kim et al., "In/Out Status Monitoring in Mobile Asset Tracking with Wireless Sensor Networks", received from www.mdpi.com/journal/sensors, published Mar. 26, 2010, 22 pages.

Fuemmeler et al., "Energy Efficient Multi-Object Tracking in Sensor Networks", received from https://ieeexplore.ieee.org/document/5439914, published Mar. 29, 2010, 9 pages.

Cocchi et al., "Subband Neural Networks Prediction for On-Line Audio Signal Recovery", received from https://ieeexplore.ieee.org/document/1021887, Published Jul. 2002, 10 pages.

PCT/US2022/027681, "PCT Notification of transmittal of the International Search Report and the Written Opinion of the International Searching Authority, or the Declaration", dated Jul. 28, 2022, 9 pages.

EP22172663.1, "Extended European Search Report" dated Jan. 25, 2023, 18 pages.

Lopez, Mareo, "The Importance of a Speaker's Resonant Frequency", proaudioland.com, 3 pages, Aug. 2015 (Year: 2015).

Thetileapp.com [online], "Learn How Tile's Tracking Device Helps You Find Your Lost Things," Dec. 9, 2016, retrieved from URL <https://www.thetileapp.com/how-it-works>, 9 pages.

PCT/US2023/017975, "PCT Notification of Transmittal of the International Search Report and the Written Opinion of the International Searching Authority, or the Declaration", dated Jun. 29, 2023, 12 pages.

* cited by examiner

DEVICE LOCATION FINDING

CROSS-REFERENCE TO RELATED APPLICATIONS

This application claims the benefit of priority of U.S. Provisional Application Ser. No. 63/197,228, entitled "Device Location Finding," filed on Jun. 4, 2021, which is hereby incorporated by reference.

FIELD

Embodiments described herein relate to locating devices using device locator services.

BACKGROUND INFORMATION

Previous device locator services do not provide meaningful assistance in locating a device when a connection between the devices has not been established. In particular, users may often travel on the same path repeatedly attempting to locate a device with prior approaches and need more information to help guide them to a missing device. As such, there is a need to provide improved locator services.

SUMMARY

Embodiments include an electronic device, a non-transitory machine-readable medium, and a method. In some embodiments, an electronic device includes a communications radio, an inertial sensor, a camera sensor, a display device, memory to store instructions, and one or more processors to execute the instructions. Embodiments may have instructions that cause the one or more processors to receive one or more inertial displacement measurement values using the inertial sensor and received camera sensor data, determine a trajectory based on the one or more inertial displacement measurement values, receive a beacon signal from a target wireless device and determine at least one signal strength value from the beacon signal, estimate at least one proximity value to the target wireless device based on the at least one signal strength value corresponding to at least one position along the trajectory, and present an indicator of the at least one proximity value to the target wireless device along the trajectory in a user interface.

In one or more embodiments, the one or more processors execute the instructions, where the instructions further cause the one or more processors to determine a category from a plurality of categories for signal strength values, and present the indicator of the proximity value in accordance with the determined category.

In one or more embodiments, the one or more processors execute the instructions, where the instructions further cause the one or more processors to present the indicator of the proximity value on a two-dimensional heat map along the trajectory within the user interface.

In one or more embodiments, the one or more processors execute the instructions, where the instructions further cause the one or more processors to present the indicator of the proximity value on a hexagonal grid.

In one or more embodiments, a wireless controller including a ranging sensor; the one or more processors to execute the instructions, the instructions further cause the one or more processors to selectively present within the user interface at least one of a ranging view, a signal strength proximity view, or a ranging and signal strength proximity view, where presenting the ranging view includes determining a range and a direction to the target wireless device via the ranging sensor of the wireless controller during a bi-directional ranging operation, determining a target position estimate for the target wireless device relative to the electronic device based on the range and direction to the target wireless device, and presenting the ranging view includes displaying at least one of the target position estimate for the target wireless device and an indicator for the direction to the target wireless device. In one or more embodiments, the selecting to present the ranging view is performed in response to establishing a wireless radio connection with the target wireless device. In one or more embodiments, the one or more processors to execute the instructions, the instructions further cause the one or more processors to request, the target wireless device, increase a beaconing rate. In one or more embodiments, the one or more wireless ranging operations include a ranging operation performed via an ultra-wideband radio. In one or more embodiments, presenting the signal strength proximity view and the ranging view includes presenting at least one indicator of the proximity value to the target wireless device and the indicator for the direction to the target wireless device along the trajectory in the user interface.

DETAILED DESCRIPTION

Embodiments described herein generally provide techniques for presenting information on a mobile device to guide or to assist a user actively engaged in locating a target device. The mobile device may use various data sources and/or signals to present information to assist in locating the target device, including signals received from the target device itself. The accessibility of the types of signals received from the target device may vary as the mobile device is being moved around within a location environment of the target device. Various user interface views may be presented within the user interface of the mobile device to represent the information when data sources/signals are accessible to the mobile device.

Figure 1A:
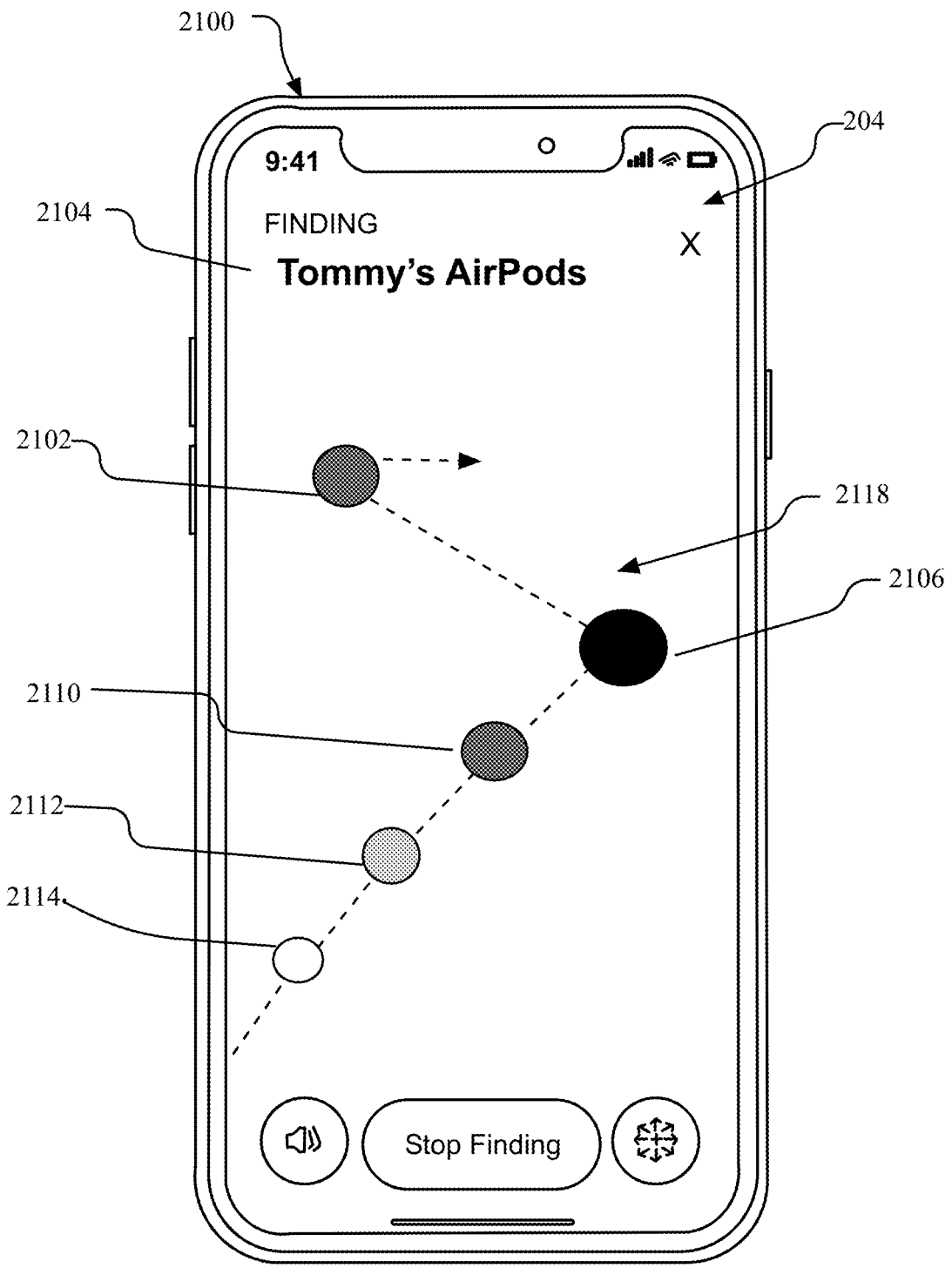
FIGS. 1A and 1B illustrate a device locator user interface, according to embodiments described herein.
Figure 1B:
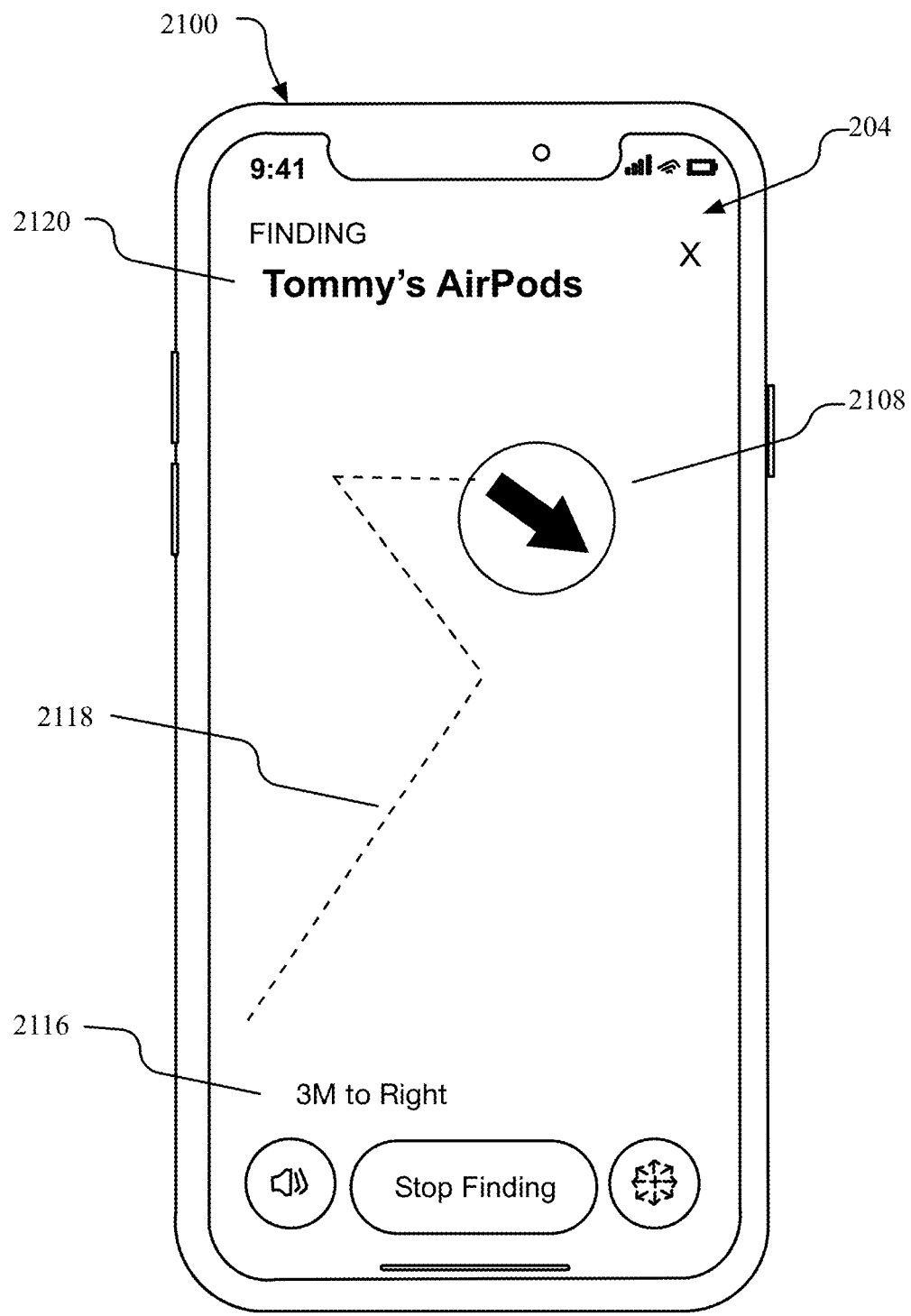

In an embodiment, signal strength measurements from signals received at the mobile device may be used to represent proximity to the target device within the user interface to indicate when the mobile device is proximate to the target device. FIGS. 1A and 1B illustrate a device locator user interface 204 on mobile device 2100, according to embodiments described herein. A "proximity view" 2104 as shown in FIG. 1A may present proximity information using visualization techniques to present the proximity information in relation to a target wireless accessory device. In an embodiment, the proximity view 2104 has visual indicators, such as user interface elements, positioned along a trajectory 2118 presented within the user interface 204 to represent a path the user has taken in their search. In some embodiments, the visual indicators may be user interface elements displayed with a gradient, a color, a color gradient, a size, a shape, and/or any other visualization technique to represent signal strength values and a corresponding defined proximity category (e.g., far, near, close, etc.) to the target device. The proximity view 2104 for finding "Tommy's AirPods" has indicators 2102, 2106, 2110, 2112, and 2114 at various positions along the trajectory 2118 within the user interface 204. Each indicator in proximity view 2104 may be a user interface element that represents proximity to the target wireless accessory device by size and color gradient within the user interface 204. In the proximity view 2104, for example, indicator 2106 is closest to the target wireless accessory device along the trajectory 2118 that the user has taken to find the target wireless accessory device as represented by a darker color and/or a larger size as compared to the other indicators (e.g., 2102, 2110, 2112, and 2114). Embodiments may use visual inertial odometry (VIO) measurements to determine the trajectory 2118 that a user has taken in their search within the user interface 204. VIO provides the ability to track movement of a mobile device in an arbitrary initial coordinate system. VIO techniques include the analysis of a sequence of images collected with the mobile device to estimate camera motion over the sequence of images.

In some embodiments, the mobile device may move to be within a threshold range of the target device allowing for a ranging process using communication between the mobile device and the target device to determine a distance from and direction to the target device. As shown in FIG. 1B, a "ranging view" 2120 of the user interface 204 may provide a distance measurement 2116 in addition to the direction 2108 to the target device that may be selectively displayed.

The proximity view 2104 for finding the target device may be used when ranging data for a ranging view 2120 is not available due to a target device not being within a threshold range of the mobile device, a target device transmitter not being in a field of view of a receiver at the mobile device, and/or a mobile device does not have a nearly unobstructed view to the target device, in some embodiments. The target device may be in the field of view of the mobile device when the receiver at the mobile device has a view of the target device transmitter.

In some embodiments, ranging using an ultra-wide band (UWB) radio technology may provide relatively precise location or distance data to a target device, but are a relatively short-range radio frequency (RF) technology wireless communication as compared to Bluetooth technology. In some embodiments, it may be desirable for the mobile device UWB receiver to have line of sight to the target device transmitter or a nearly unobstructed view of the target device to obtain optimal ranging location data. Proximity information in the form of signal strength information may be relatively less precise in comparison to UWB but may cover a wider area offering a longer range and can be obtained from advertisements before the wireless radio connection is established. Bi-directional communication may not be established with a connection between the mobile device and target device, but advertisements received at the mobile device may provide signal strength information to aid in directing the user to the target device prior to establishing a connection, in some embodiments. The combination of techniques may assist the user in locating the target wireless accessory device.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1C:
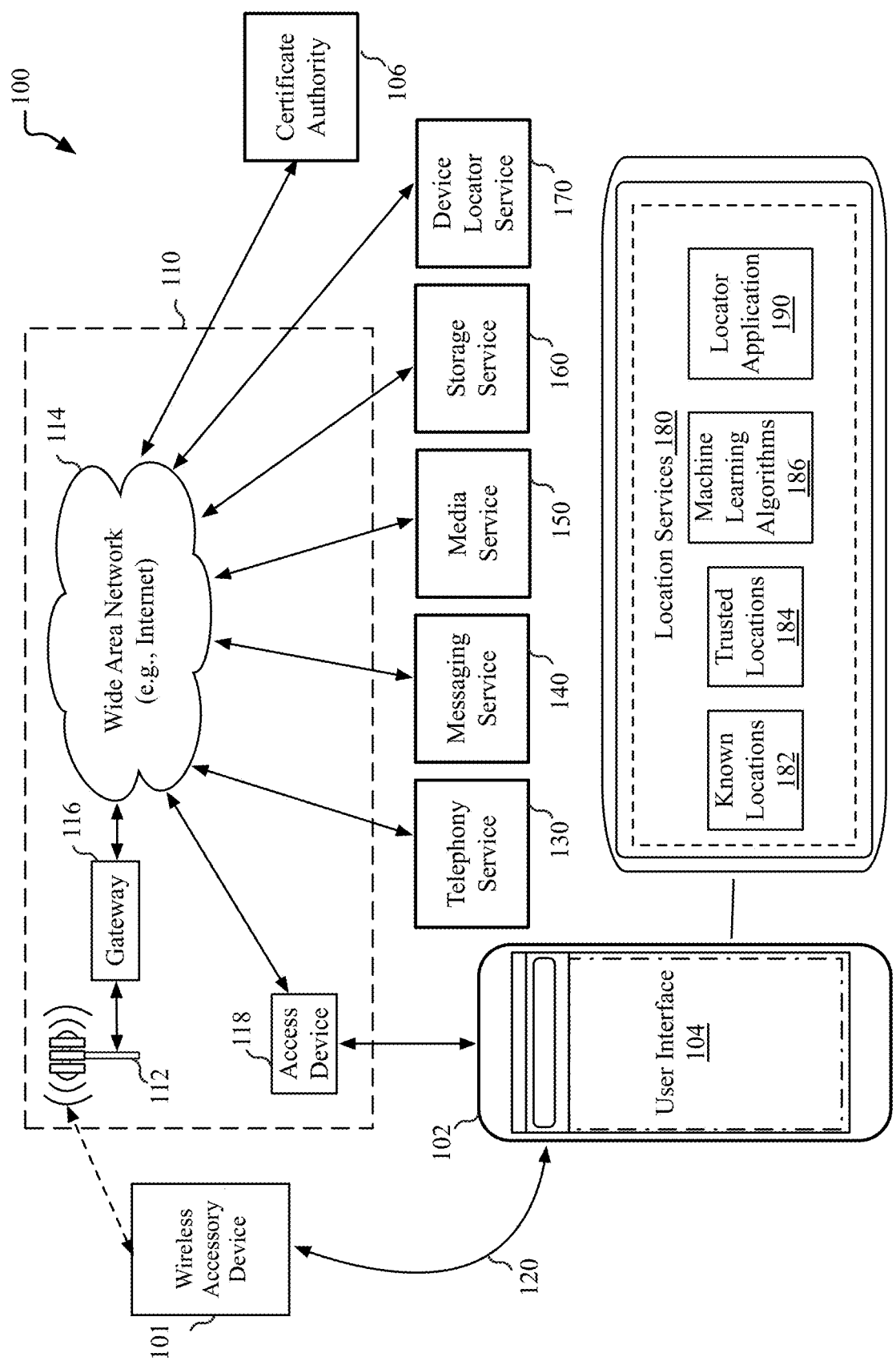
FIG. 1C is a block diagram of a network operating environment 100 for mobile devices, according to an embodiment.

FIG. 1C is a block diagram of a network operating environment 100 for mobile devices, according to an embodiment. The network operating environment 100 includes multiple mobile devices, such as accessory device 101 as well as mobile device 102. Accessory device 101 may be paired to mobile device 102. In an embodiment, mobile device 101 may be a pair of accessory devices that may be paired as a device group. Optionally, the device group with accessory devices 101 may be stored in a mobile device with a wired connection, such as a case to hold the accessory devices 101. The case may also be an accessory device that may be paired with mobile device 102 in some embodiments. By way of example, accessory device 101 may be collectively devices such as Apple AirPods® or EarPods®. In some embodiments, accessory device 101 may not be able to communicate over a wide area network. In other embodiments, the mobile devices 101 and 102 can each be any electronic device capable of communicating with a wireless network and a wireless accessory device. Some example mobile devices include but are not limited to a smartphone, a tablet computer, a notebook computer, a wearable computer (e.g., smartwatch or other wearable computing accessory), a mobile media player, a personal digital assistant, AirPods®, EarPods®, locator tags, headphones, head mounted display, health equipment, and other similar devices. Each of mobile devices 101 and mobile device 102 optionally can include a user interface, such as user interface 104 of mobile device 102. In other embodiments, mobile device 101, as an accessory device, may not have a user interface. Mobile devices 101 and 102 may be a third-party device that utilizes an application programming interface to access device locator services. The third-party device may be provided by a different device manufacturer or be part of a different ecosystem (e.g., operating system) from mobile device 101 and 102. Mobile devices 101 and 102 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 101 and/or mobile device 102 can be physically connected to the access device 118 using one or more cables, for example, where the access device 118 is a personal computer. In this configuration, mobile device 101 or mobile device 102 can be referred to as a "tethered" device. In one embodiment, mobile device 101 can communicate with mobile device 102 via a wireless peer-to-peer connection 120. The wireless peer-to-peer connection 120 can be used to synchronize data between the devices.

Mobile device 101 or mobile device 102 can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 101 and mobile device 102 to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 101 and 102.

In some embodiments, accessory device 101 and mobile device 102, and/or device group may be registered with a certificate authority 106. In some embodiments, the certificate authority 106 is an entity that issues digital certificates, and the service may be implemented using a set of servers managed by a device manufacturer, service provider, or a registration service. The certificate provided by the certificate authority 106 may attest to the validity of received verifiable information about the device, such as a particular manufacturer for the device, a serial number, an identifier for a device group or other identifier, an indicator that device is part of a device group, and/or any other verifiable information. In some embodiments, a device manufacturer may establish the device group by grouping serial numbers of accessory devices in the device group. In further embodiments, the certificate can be encrypted by the device 101 and 102 prior to being sent to a third party and may be decrypted at an attestation service (e.g., certificate authority or another attestation service) when the third-party requests verification of information provided by accessory device 101, mobile device 102, and/or devices within device group. In some embodiments, a secure token may be provided in requests to pair by an accessory device 101. Additional examples of paired devices using location services may be found in U.S. patent application Ser. No. 17/219,595 filed Mar. 21, 2021 entitled "Secure Pairing and Pairing Lock for Accessory Devices," which is incorporated by reference herein in its entirety.

Mobile device 101 and 102 may have applications, services, and functionality locally accessible on the devices including location services 180. In particular, mobile devices 101 and/or 102 may have a device locator application (e.g., a "Find my" application) 190 to utilize device locator services 170 and location services 180. Locally accessible data may be stored on known locations 182 and safe or trusted locations 184. In some instances, machine learning algorithms 186 may be used to identify known locations 182, and/or trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations, such as locations frequented by a user. Safe or trusted locations 184 may be designated explicitly or confirmed as such by a user of the device 102A-B after data analysis. In other instances, the known locations 182 or the trusted locations 184 may be classified offline and provided by device locator service 170 or a third-party (e.g., a database with map information).

On-device heuristics and/or machine learning models may be used to infer relationships between a user and locations based on analysis of the locally stored data on frequented locations including frequently visited locations by the user, known locations, and/or any other locations. For example, a frequently visited location such as a home, a vehicle, a workplace, any location frequented by a user with mobile device (e.g., accessory devices, 101 and mobile device 102) and/or any other location designated as a trusted location 184 by the user. Known locations 182 may be business locations, public spaces, parks, museums, and/or any other location that may be frequented by a user. Boundary information for the respective stored locations may be stored along with classification type for the location and any semantic label assigned to the location. Stored information may include a defined set of boundaries or a radius distance around a point location to allow for creation of a geofence for the location. The geofence is a virtual perimeter for a real-world geographic area. Global positioning system (GPS) may be used to create a virtual fence around a location and track the physical location of the mobile device 101 and 102 within the geofence boundary as well as entry and exit of the bounded area.

Machine learning algorithms 186 may include on-device heuristics, machine learning algorithms, or a combination thereof to analyze and assign a label regarding movement or travel of a device to be designated as being "in transit" state or "settled" state in a particular location for a time period. Analysis may be performed using a variety of signals from data sources available to the mobile device 102, including, but not limited to, the following: sensor data, positioning data, calendar data, transit card usage data, application data, historical data on patterns/routines of travel, and/or any other data accessible to the mobile device 102. In some embodiments, a mobile device 102 may be classified with a "settled" semantic label after remaining within the geographic boundaries that define a location (e.g., the trusted location 184) for a defined time period. In the simplest case, positioning data for the mobile device 102 may remain within the boundaries of a geofence for a particular location for a duration of time (e.g., 5 minutes). Sensor data, such as accelerometer data, may indicate that the mobile device 102 is at rest to support an inference of being settled. Application data may support the inference that the mobile device 102 is settled, such as the mobile device being located at a calendar appointment location. Application data indicating a type of application in use may also provide an inference of the device being settled, such as using a media application. Historical data for the user on routines or patterns in travel may be used to determine whether the mobile device 102 is settled, such as a bedtime routine at a home or hotel location. Mobile device 102 may be classified as with an "in transit" label based on prior behavior, patterns, or routines for the user and analyzed on mobile device 102. For example, the user may have routine of going to work around the same time every day and an "in transit" state may be assigned if the data on the device supports that the pattern is being repeated. In the simplest case, a speed at which the mobile device is moving or entering and exiting known geographic areas (e.g., using geofences) may allow for the inferring that the mobile device 102 is in transit. If the mobile device 102 is detected as accelerating in known areas of transit (e.g., on roads, highways, train routes, etc.), then the mobile device 102 may be given the status of "in transit." Similarly, if transit applications/cards are used/in use, then the mobile device 102 may be designated as "in transit".

Figure 2:
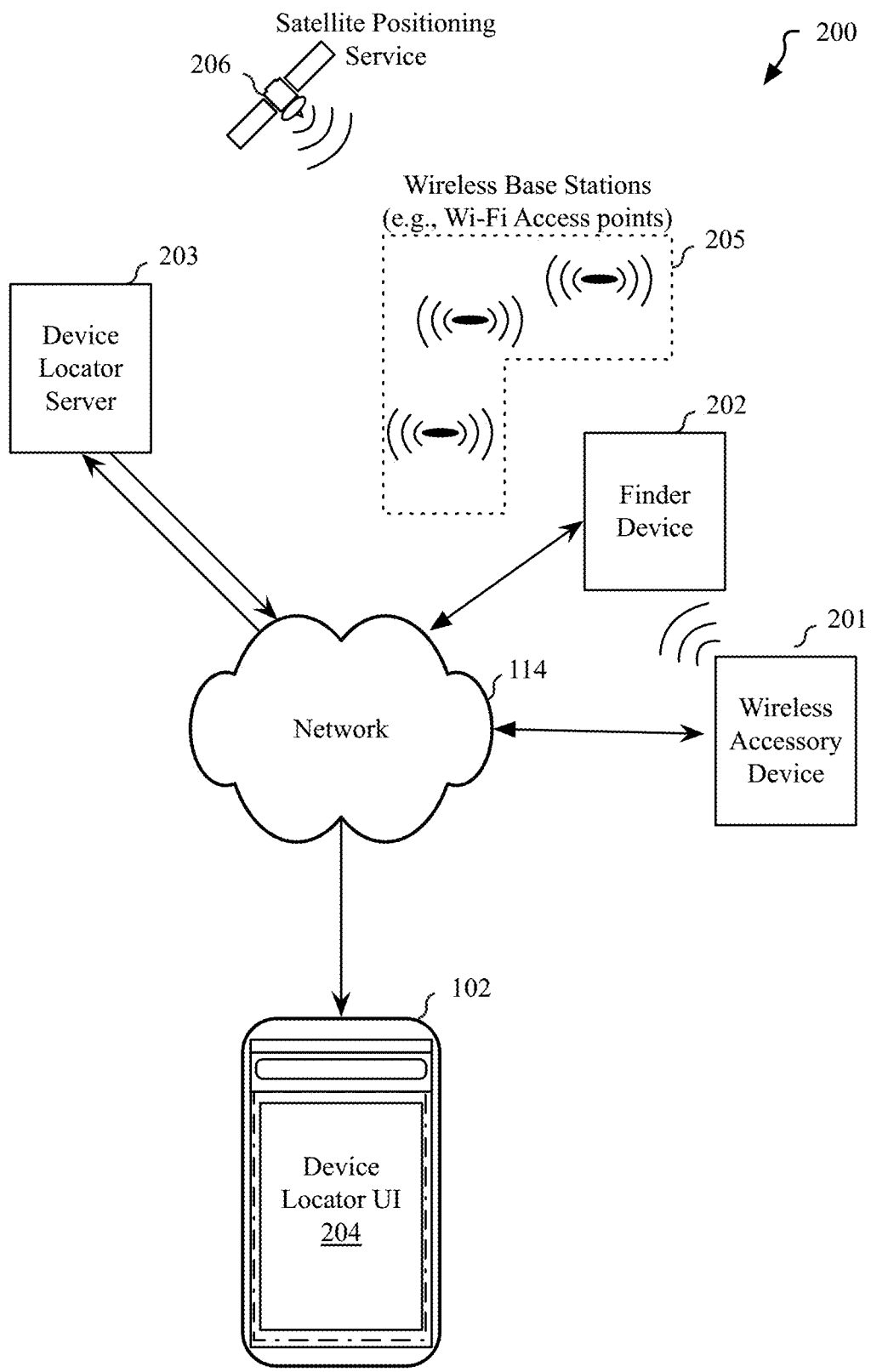
FIG. 2 illustrates a system to locate wireless accessories, according to an embodiment.

FIG. 2 illustrates a system 200 to locate wireless accessory 201, according to an embodiment. In one embodiment, the wireless accessories 201 are another embodiment of accessory devices 101 (and optionally a case) that may be paired as part of a device group. In other embodiments, accessory device 201 are separate accessory devices that are not part of a device group and are each paired separately to mobile device 102. Each accessory device 201 includes one or more wireless transceivers and can communicate, either directly or indirectly (e.g., through another device or computer) with a companion device (e.g., mobile device 102) over a wireless network or peer-to-peer communication link. Accessory devices 201 may provide the beacon signal for the case and any accessories in the case. Accessory device 201 is separated from the case and independently and separately able to be found by providing the beacon signal. Some examples of wireless accessory devices 201 include but are not limited to wireless earbuds, EarPods, AirPods, input devices, a charging device, a case for accessories, headphones, headsets, fitness equipment, health equipment, display devices, external hard drives, other wearable devices (e.g., smartwatches, fitness bands, optical head-mounted displays) adapters, speakers, and/or other devices. Paired groups of accessories may be the same type of device (e.g., speakers, AirPods, fitness weights, etc.) or different types of devices (e.g., smartphone and credit card reader, etc.). The wireless accessory 201 can also include other wireless devices such as input devices including, but not limited to credit card reading devices, stylus devices, mouse, keyboard, game controllers or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory 201 can also be any other wireless device, including beacons or locator tags that can be attached to other devices to enable the tracking or locating of those devices. In one embodiment, the wireless accessory 201 can be from a device group of accessory devices that are paired with the mobile device 102 using a wireless technology standard, such as but not limited to Bluetooth. The wireless accessory 201 can also communicate with the mobile device 102 over wireless technologies including the implementation of any wireless standards and protocols, such as Wi-Fi direct, Zigbee, or AirPlay. While the companion device to which the wireless accessories 201 are paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the individual wireless accessory 201, and/or a device group. In one embodiment, the beacon identifier is a public encryption key associated with the device.

The beacon signal can also convey information about the wireless accessory 201, such device status information and/or verifiable information. Device status information in the beacon signal may include, but is not limited to the following: a beacon type, a device classification, a battery level, any pre-defined device status, a device state, a lost status, an alarm status, a separated from owner status, a near-owner status, a proximate to one or more accessory devices in a device group status, a wired or wireless connection status, a physically connected to one or more accessory devices in a device group status, a pairing status indicating whether accessory device is paired or not paired, a pending pairing status, a battery life state, a charging status, and/or any other status information. The lost or "separated from owner" status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near-owner status can indicate that the wireless accessory 201 has detected the nearby presence of the mobile device 102 associated with the owner of the accessory.

In some embodiments, verifiable information may include any information that may be needed to establish trust or authority that a pairing process and/or finding process may proceed with the device presenting the verifiable information. By way of example, verifiable information may include information established by a device manufacturer, such as a serial number or set of serial numbers in a device group. In some embodiments, the verifiable information may include status or state information for the device. The verifiable information may include, but is not limited to, the following: a device type, a member of device group, a serial number, a device group, serial numbers of other devices within a device group, state or status information, a software version, and/or any other verifiable information. Verifiable information may be sent to the certificate authority 106 or other attestations service to verify received information presented by the device to another device. Verifiable information may be encrypted and/or sent with a token to allow for further verification of the device.

In some embodiments, the beacon signal can be detected by a finder device 202, which is locally proximate to the wireless accessory 201 in order to use crowdsourcing to locate a lost wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device 202 over the wide area network 114 to a device locator server 203. The timestamp for a determined location for the finder device 202 can be correlated with a timestamp for which a beacon signal was received to associate a geographic location with a received beacon signal.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory, the owner can access a device locator user interface 204 on the mobile device 102. The device locator user interface 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
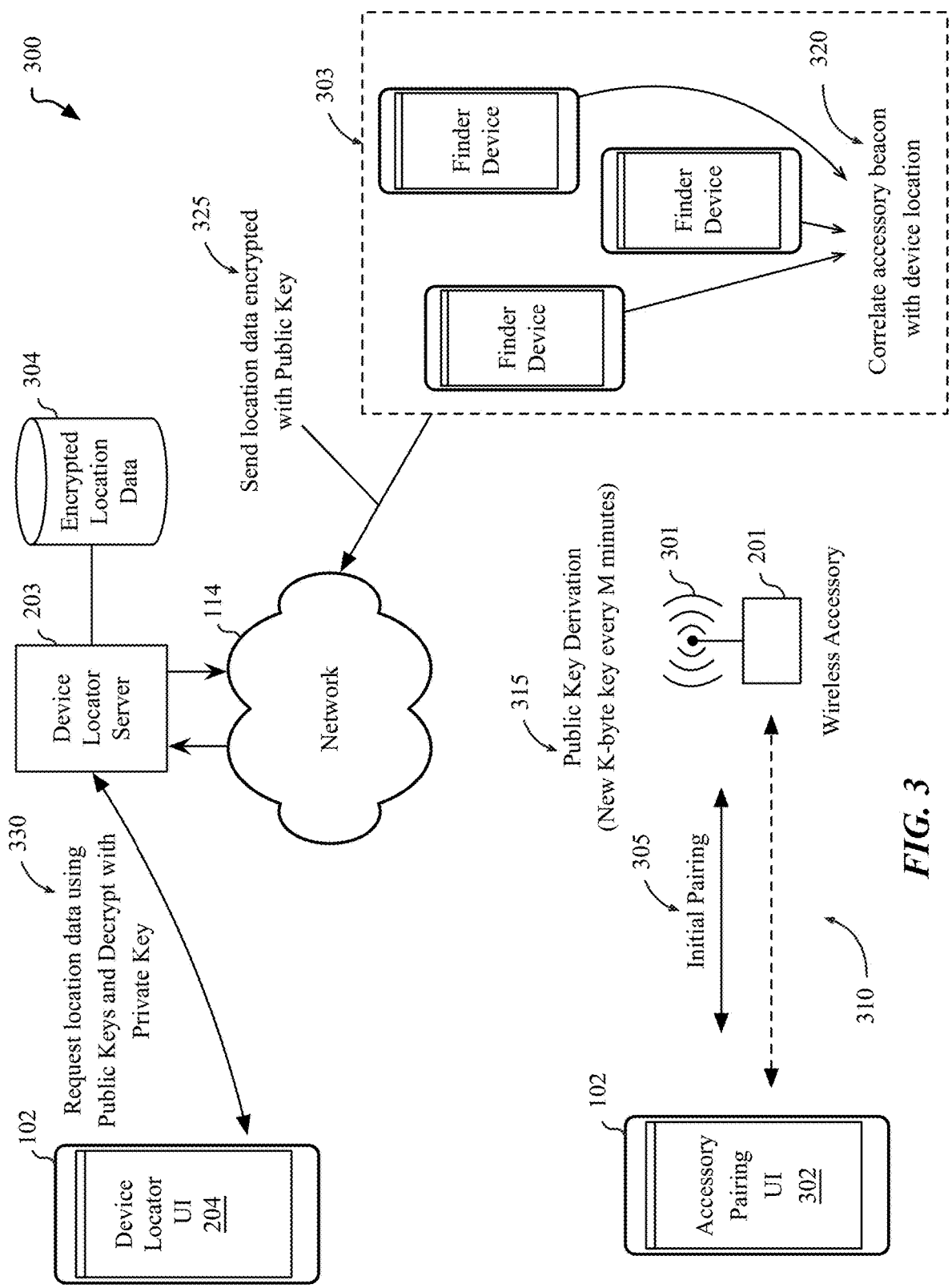
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 (e.g., example of device 101) can present an accessory pairing UI 302 by which the user can pair the mobile device 102 with the wireless accessory 201. During an initial pairing (305) between the mobile device 102 and the wireless accessory 201, a public key exchange (310) can be performed between the mobile device and the wireless accessory 201. In one embodiment, during the public key exchange (310) the mobile device 102 and the wireless accessory 201 exchange public keys of public key pairs generated by the device and the accessory 201. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can the wireless accessory 201 to periodically derive additional public keys.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i=\lambda_i \cdot P$, which defines a group operation between a scalar or exponent value $\lambda_i$ and group elements, such as, for example, Elliptic Curve points P. The scalar or exponent value $\lambda=KDF(AT, i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1}=H(\lambda_i|time)$, with $\lambda_0=AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near-owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near-owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near-owner state, the amount of data transmitted by the beacon signal 301 may be reduced. In one embodiment, the rate at which new public keys are generated can also be reduced while the wireless accessory is in the near-owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near-owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303 (finder devices may be finder device 202) and/or the mobile device 102, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. For example, the set of finder devices 303 can perform operations (320) to correlate the beacon signal 301 received from the wireless accessory 201 with a device location associated with the finder device 303. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is send anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a locator application 190 or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public keys or public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send the previous 24 hours of public keys (or hashes of the 24 hours of public keys) within the request 330. If no data is found for 24 hours of public keys, the mobile device 102 can send generate keys for an earlier period, back to a pre-determined location data retention limit.

In one embodiment the encrypted location data is stored and indexed based on a hash of the public key instead of the public key to prevent the provider of the location service data from storing data that can be used to tie the encrypted location data to a specific device, and thus a specific user or user account. The finder device can send the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner. Additional examples of paired devices using location services may be found in U.S. patent application Ser. No. 16/543,227 filed Aug. 16, 2019 entitled "A System and Method for Locating Wireless Accessories," which is incorporated by reference herein in its entirety.

Figure 4:
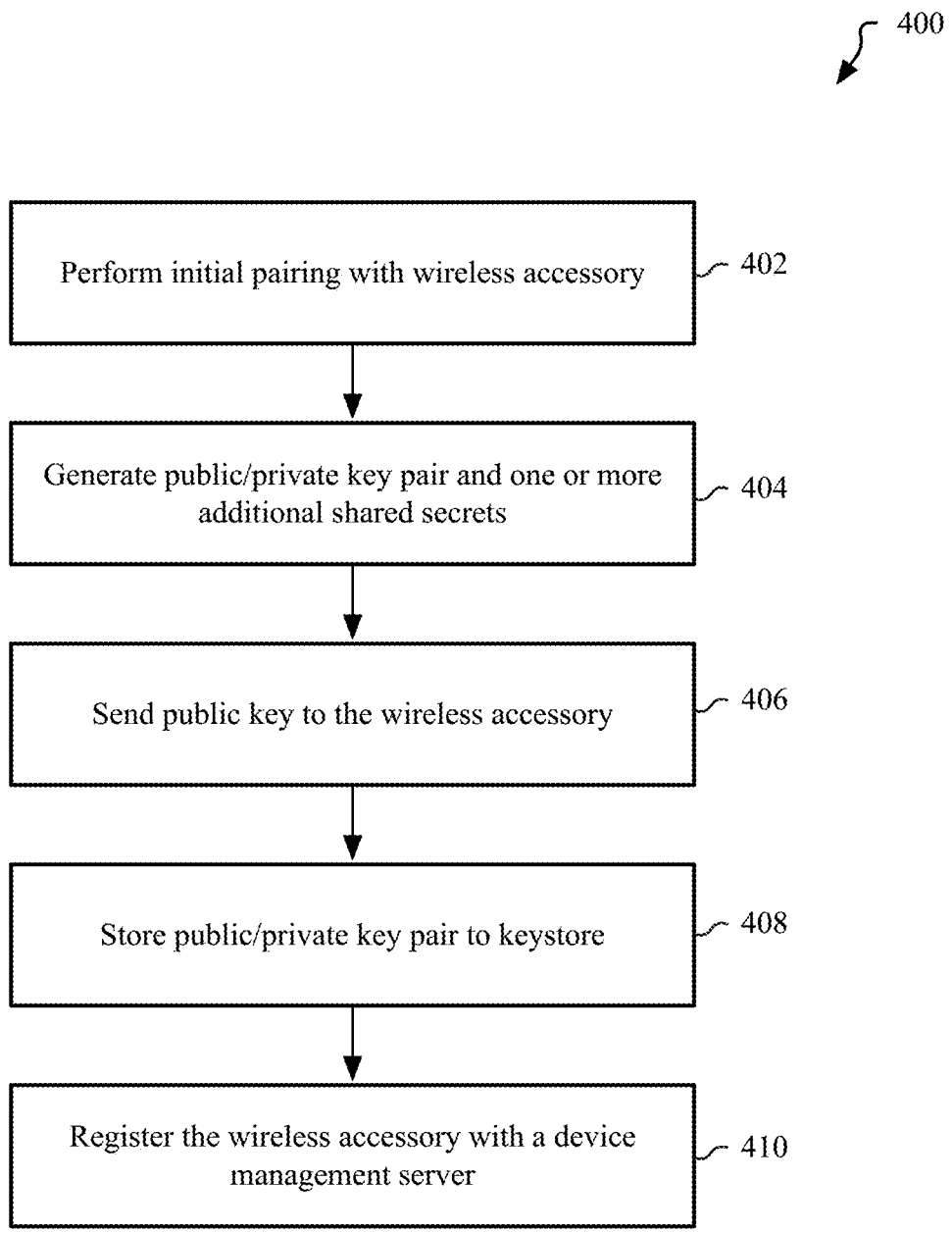
FIG. 4 is a flow diagrams illustrating methods for use with the device locator systems described herein.

FIG. 4 is a flow diagrams illustrating methods for use with the device locator systems described herein. FIG. 4 illustrates a method 400 to pair a mobile device with a wireless accessory. Aspects of method 400 are also illustrated in FIG. 2 and FIG. 3, as described above. For example, the description of the operations below refers to the mobile device 102, wireless accessory 201 and device locator server 203.

As shown in FIG. 4, method 400 includes an operation (402) that performs an initial pairing with a wireless accessory. The initial pairing can be a Bluetooth pairing or another type of pairing using other wireless radio technologies.

During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (404). The device can then send the public key and one or more additional shared secrets to the wireless accessory (406). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to keystore (408). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (410). Registering the wireless accessory with the device management server can form an association between the wireless accessory and the cloud services account to which the mobile device is associated. In some embodiments, the mobile device may register the wireless accessory and the device group 104. Information stored in a device group profile for the device group may also be synchronized between devices tied to a cloud services account (e.g., a user account). The device management server can be associated with other cloud-based servers that are used to facilitate cloud-based services accessible to the mobile device, such as the device locator server 203 of FIG. 2 and FIG. 3.

Figure 5:
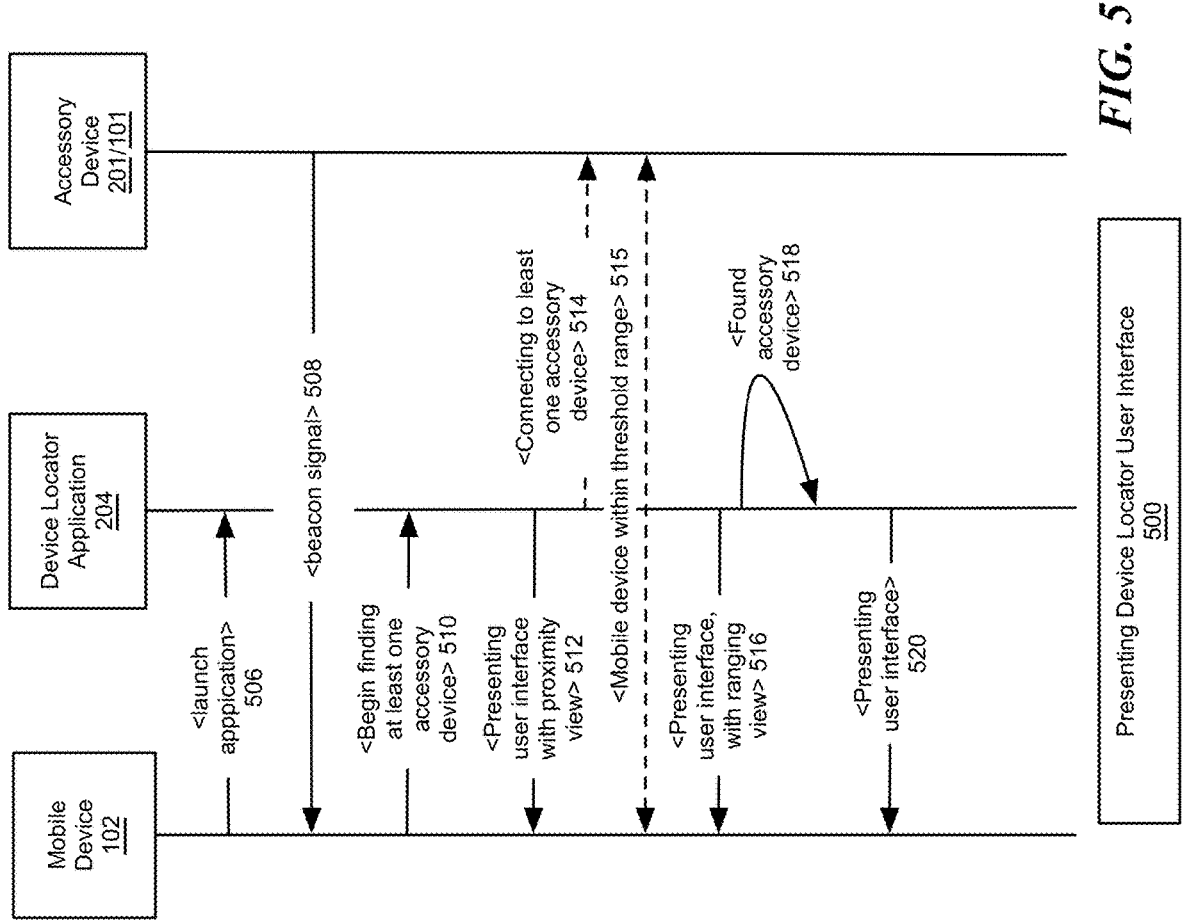
FIG. 5 is a sequence diagram illustrating methods to present a device locator user interface for use with the device locator systems described herein.

FIG. 5 is a sequence diagram 500 illustrating methods to present a device locator user interface for use with the device locator systems described herein. Mobile device 102 may launch the device locator application 204 (506). Mobile device 102 may receive a beacon signal from accessory device 201 including advertisements (508). The advertisements may be sent prior to launching the application (506) and/or subsequent to launch of the device locator application 204. In some embodiments, BLE advertisements may be sent prior to establishing a wireless radio connection to the mobile device 102. In an embodiment, the BLE advertisements may be received every two seconds. Signal strength measurements may be determined from the beacon signal and the process may begin for finding at least one accessory device 201 (510) paired to mobile device 102 (510) with a proximity view for the user interface 204. The proximity view for the device locator application 204 user interface may be presented with a visual indicator representing the proximity of a target accessory device 201. The visual indicator may correspond to the signal strength measurements (512) from the received advertisements at the mobile device 102. Optionally, a wireless radio connection may be formed between the target accessory device 201 and the mobile device 102 (514) allowing for the mobile device 102 to request that the target accessory device 201 play a sound, in some embodiments. In some embodiments, a wireless radio connection may be formed between the target accessory device 201 and the mobile device 102 and the mobile device may request to a ranging process be performed. When the mobile device 102 is within a threshold range of the target accessory device (515), the ranging process may be performed to determine a distance from and direction to the target wireless accessory device 201. A ranging view for the device locator application 204 user interface may be presented (516). The ranging view may provide a direction and a calculated distance to the wireless target to aid in finding the accessory device 201 (518). The ranging view may be presented selectively with the proximity view and/or independently within the user interface 204. The device locator application 204 user interface may be presented querying the user as to whether the accessory device 201 was found (520).

Figure 6:
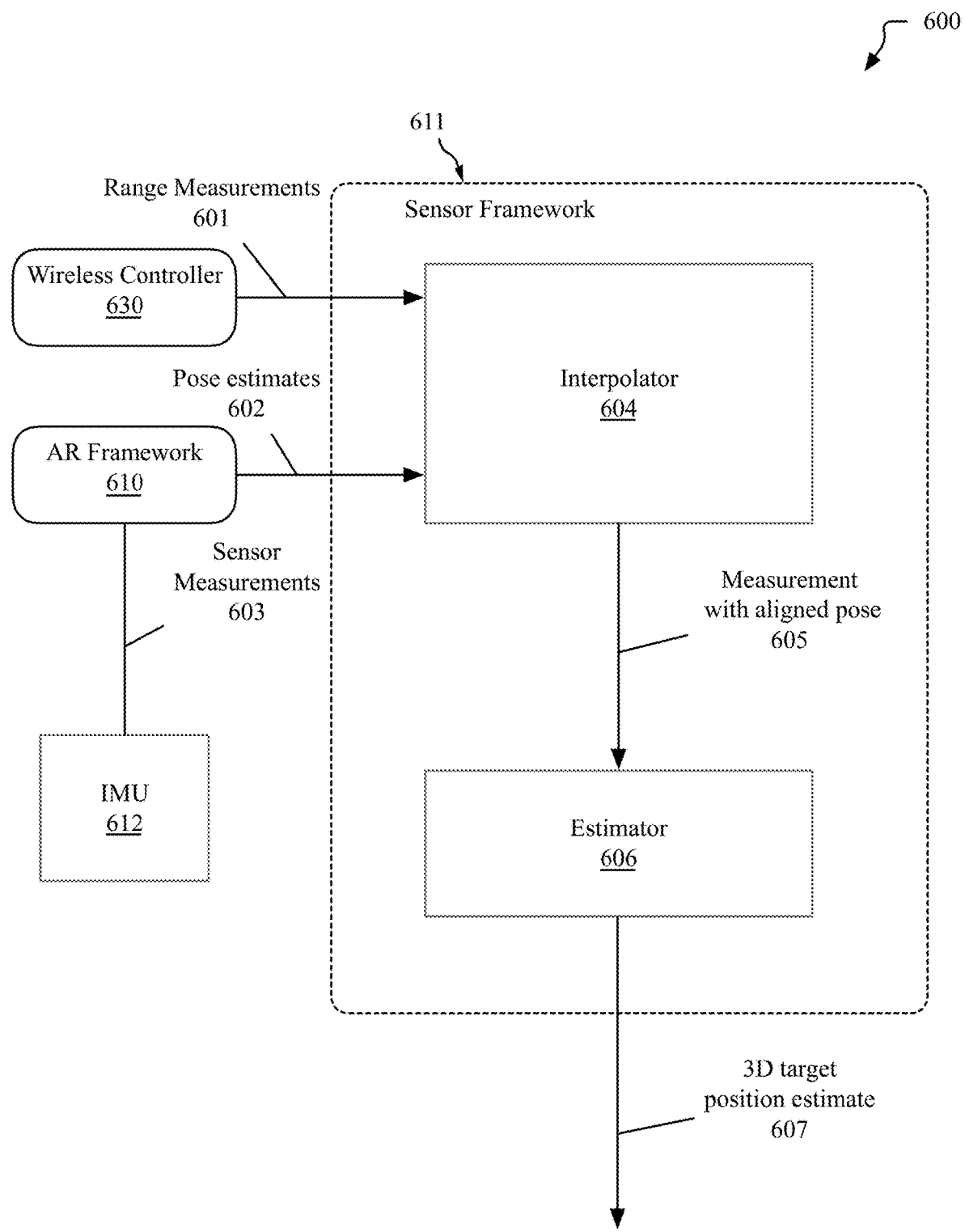
FIG. 6 illustrates a system to enable ranging and pose estimates to generate a target position estimate of a target device, according to an embodiment.

FIG. 6 illustrates a system 600 to enable ranging and pose estimates to generate a target position estimate of a target device, according to an embodiment. In one embodiment the system 600 includes a wireless controller 630, an IMU 612, and a set of frameworks that execute on an application processor of a mobile device 102 as described herein. The set of frameworks can include an augmented reality (AR) framework 610 and the sensor fusion framework 611. The wireless controller 630 can send range measurements 601 interpolator logic 604 within the sensor framework 611. The AR framework 610 can receive sensor measurements 603 from the IMU 612 and generate pose estimates 602 for the mobile device 102. The pose estimates 602 can be sent to the interpolator logic 604 within the sensor framework 611. The interpolator logic 604 can process the range measurements 601 and pose estimates 602 to generate a measurement with an aligned pose 605. The interpolator logic 604 can generate the measurement with an aligned pose 605 by interpolating and aligning range measurements 601 and pose estimates 602 based on the times in which the measurements and estimates were determined. The measurement with an aligned pose 605 can be provided to estimator logic 606. The estimator logic 606 can then generate a three-dimensional target position estimate 607 for use by the mobile device. This target position estimate can be used by the mobile device 102 to generate views of a location environment.

The interpolator logic 604 and estimator logic 606 can include various algorithmic techniques to overcome anomalous data and sensor interference to enhance the precision of the three-dimensional target position estimate 607. In one embodiment, the system 600 can fuse inertial data gathered from the IMU 612 with images captured via one or more cameras to perform visual inertial odometry (VIO). VIO techniques include the analysis of a sequence of images to estimate camera motion over the sequence of images. Using image-based camera motion estimation and inertial measurements captured over the same period of time, motion of the mobile device through a coordinate system can be estimated, providing software of the system 600 the ability to estimate both the position of the mobile device 102 (or any finder device) and the target device to be located within a three-dimensional coordinate space.

In one embodiment, the target location estimate can take the form of a nonlinear least-squares problem that can be solved using a non-linear-least-squares (NLLS) batch filter. For example, given $r_i$ as a range measurement at time $t_i$, and $p(t_i)$ as a pose estimate relative to the center of VIO coordinate system at the same time, a target location x=[x y z]$^T$ can be determined that minimizes the cost function:

$$J(\underline{x}) = \frac{1}{2}\sum_{i=1}^{N}\frac{(r_i - \|\underline{x} - \underline{p}(t_i)\|)^2}{\sigma_{range,i}^2}$$

The specific pose estimate used may be based on or relative to the position of the wireless ranging radio antenna on the mobile device. Alternatively, a Kalman Filter or spatial occupancy grid-based approach may be applied.

In one embodiment, once an initial target position for a wireless device has been determined within the three-dimensional coordinate space, the relative target position of the wireless device can be updated using AR data even in the absence of updated range measurements between the wireless device 102 and the accessory device 201. In such scenario, the frequency of wireless ranging operations may be throttled to reduce power consumption by the target device 201 and mobile device 102.

Figure 7:
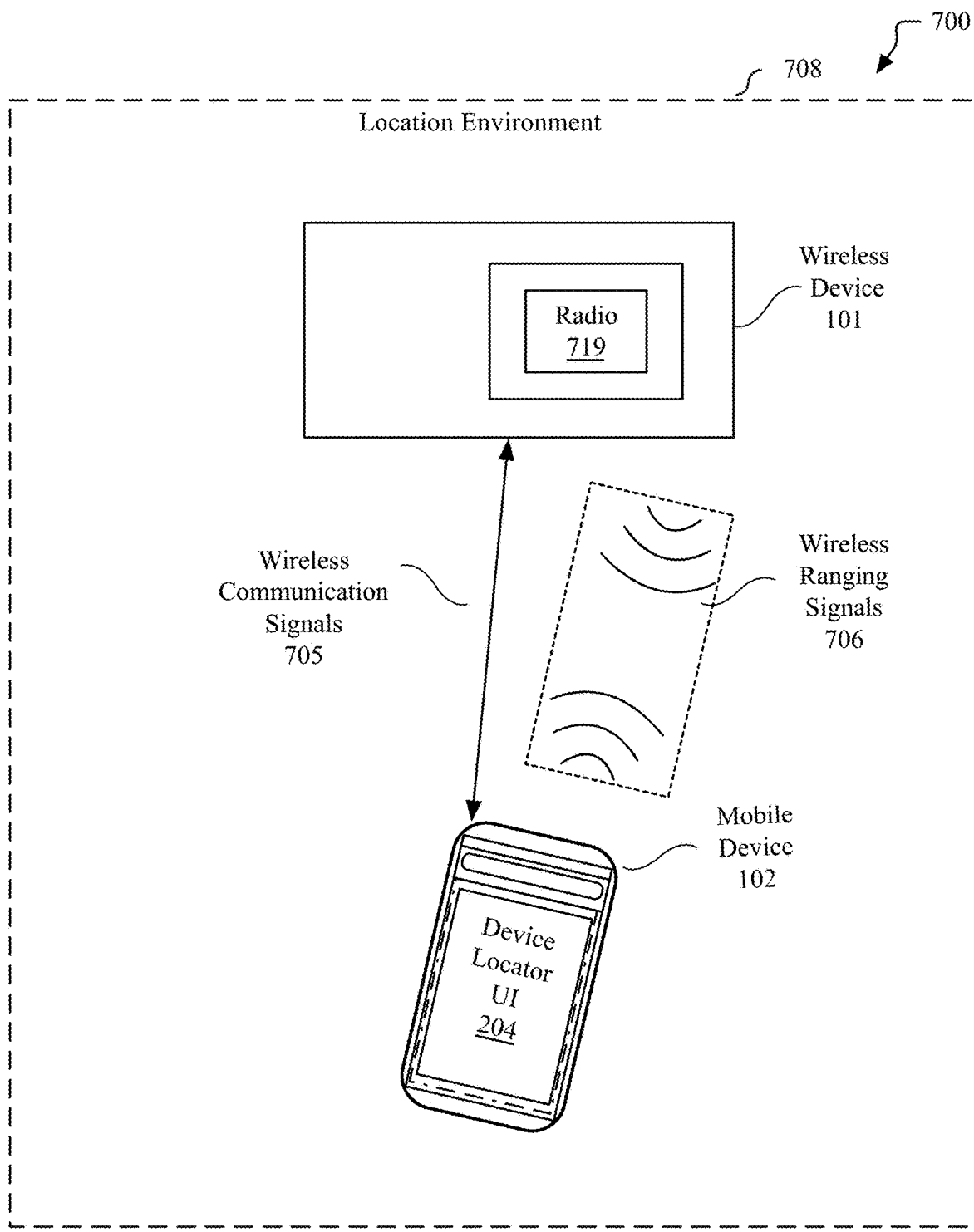
FIG. 7 illustrates a system in which proximity enhancements can be enabled for a device locator application.

FIG. 7 illustrates a system 700 in which proximity enhancements can be enabled for a device locator application 204. One embodiment provides a system 700 to enhance the functionality of a device locator application 204 when in a location environment 708 that is proximate to an item or target device 201 to be located. The location environment 708 can include a mobile device 102 (e.g., smartphone, wearable, tablet, etc.). The mobile device 102 can communicate wirelessly with a wireless device 101 that includes a radio 719. The mobile device 102 can also include a variant of the radio 719 in the wireless device 102. The wireless device 201 may also be a mobile device or can be a wireless accessory 201 as described herein.

The devices can communicate wirelessly via wireless communication signals 705 by detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). The wireless communication signals 705 can be carrier signals that conform to wireless communication technologies such as, but not limited to Wi-Fi or Bluetooth. In addition to wireless communication, the mobile device 102 and the wireless device 201 perform wireless ranging operations using wireless ranging signals 706. The wireless ranging signals can be, for example, ultra-wideband signals that can be used to determine a distance and/or angle between the wireless device 201 and the mobile device 102 using techniques described herein. In one embodiment, data provided by the wireless ranging signals 706 can be correlated with other metrics, such as an RSSI of the wireless communication signals 705. In one embodiment, a communications processor of the mobile device 102 and the wireless device 201 can fuse multiple types of ranging to provide a unified distance and/or angle estimate based on multiple types of radio data.

The mobile device 102 can provide a device locator UI 204 that presents a map and/or a view of the location environment 708. The map and/or view can present a virtual representation of the wireless device 201. The virtual representation can streamline the process of locating the wireless device 201 by user of the mobile device 102. For example, using a direction indicator that points to a detected location of the wireless device 201 can simplify the process of finding the approximate location of the wireless device 201. The direction indicator can be paired with a map of the location environment 708, where the map can include the virtual representation of the wireless device 201. When the mobile device 102 is proximate to the wireless device 201 such that beacon signal including wireless communication signals 705 and/or ranging signals 706, a proximity view and/or a ranging view of the location environment 708 can be presented, which can allow the user to identify the wireless device 201 when the wireless is hidden from view.

In one scenario the wireless device 201 may be concealed by an item. The item may be, for example, a jacket or another article of clothing and the wireless device 201 may be a smartphone or tablet device that is in a pocket of the item. The item and the wireless device 201 may each be within a container, such as a backpack, storage chest, item of luggage, or another item that make reduce the efficiency of audio-based location techniques that rely on the wireless device 201 to play a sound that can be heard by a user.

In another scenario, the wireless device 201 may be a beacon peripheral or locator tag that is attached to the item. To find the item, the user can use the device locator UI 204 on the mobile device 102 to find the wireless device 201, enabling the user to locate the item to which the wireless device 201 is attached. The proximity enhancements described herein can be used to augment the device locator UI 204, allowing the user to quickly determine the location of the item, via the wireless device 201, in scenarios where the item may be concealed by a container or another physical item.

In one embodiment the mobile device 102 can establish a secure wireless communication connection (e.g., a Bluetooth connection) with the wireless device 201 (e.g., via wireless communication signals 705) and command the wireless device 201 to begin a wireless ranging process, for example, using the wireless ranging signals 706, which can be UWB signals. The wireless ranging signals 706 enable the mobile device 102 to receive measurements of range and angles to the wireless device 201. In some embodiments, the mobile device 102 may request that the target wireless device 201 increase the rate of sending advertisements (e.g., from every 2s to every 30 ms) to aid in finding the wireless device 201.

In an embodiment, prior to establishing a secure wireless communication connection and/or with an established wireless connection, signal strength measurements may be determined from received advertisements and may aid in directing a user to the wireless device 201.

In embodiments described herein, wireless ranging can be performed using any standard or proprietary ranging technique, or any combination of standard and/or proprietary ranging techniques. A wireless ranging operation can be performed to determine a distance between devices (e.g., between an initiator and a responder), a direction between devices, or both. For example, a Time of Flight/Time of Arrival (ToF/ToA) can be determined for one or more messages between the devices, which can be used to establish a measure of distance. The one or more messages can have any format and can be transmitted using any wireless protocol. In some embodiments, ToF/ToA can be determined using a bi-directional exchange of two or more messages. In some embodiments, one or more messages used to perform ranging can be secured, e.g., by encrypting or otherwise protecting at least a portion of the content. Further, in some embodiments, the direction of the source of one or more wireless signals can be determined using a technique such as Angle of Arrival (AoA). For example, AoA estimation can be performed using multiple receive elements (e.g., elements of an antenna array) to measure the different times (TDOA) and/or different phases (PDOA) of arrival of a signal. Additionally, or alternatively, in some embodiments, directionality can be determined by measuring Doppler shifts to establish a frequency difference of arrival (FDOA). Wireless ranging techniques can be applied individually or in combination to perform a single ranging operation. Further, wireless ranging techniques can be applied individually or in combination to perform on-going ranging operations, such as continuous or intermittent ranging, and a history of measurements can be captured and used in performing operations based on range and/or direction.

The incoming measurements can be processed to reduce measurement noise and stabilize the estimated location of the lost item. In one embodiment, the mobile device 102 can use a sensor fusion technique that relies upon multiple streams of measurements to arrive at a best estimate of device location. For example, incoming range and/or angle measurements can be fused with position and orientation measurements of the mobile device 102. The position and orientation measurements can be gathered using visual-inertial odometry (VIO), which determines the device location and orientation using an IMU and computer vision using camera data. The VIO data enables software on the mobile device 102 to be aware of the movement and orientation of the device. Combining the VIO data with the range and/or angle measurements determined via the wireless ranging signals 706 enables estimation of the most likely position of the wireless device and allows the user to be pointed towards the wireless device 201. Additionally, combining the VIO data with the signal strength measurements via the wireless communication signals 705 may aid in directing the user to the wireless device 201 with the proximity view and/or in combination with the ranging view. VIO data may be particularly useful in scenarios where one or more of the range or angle measurements may be inaccurate due to multipath signal propagation effects.

The algorithm for determining the position of a lost item can be accessed via the device locator UI 204. When a user intends to locate an item, the user can select the item from a list of registered devices and select a "find" button that is presented via the device locator UI 204. In various embodiments, multiple user interfaces may be presented. Some interfaces resemble a two-dimensional compass like view with a two-dimensional arrow guiding the user to the target item or device to be found. The proximity view and/or combination of proximity and ranging view of the device locator UI 204 may provide an arrow guiding the user in addition to presenting the trajectory that the user has taken in their search with proximity indicators presented along the path taken.

Figure 8:
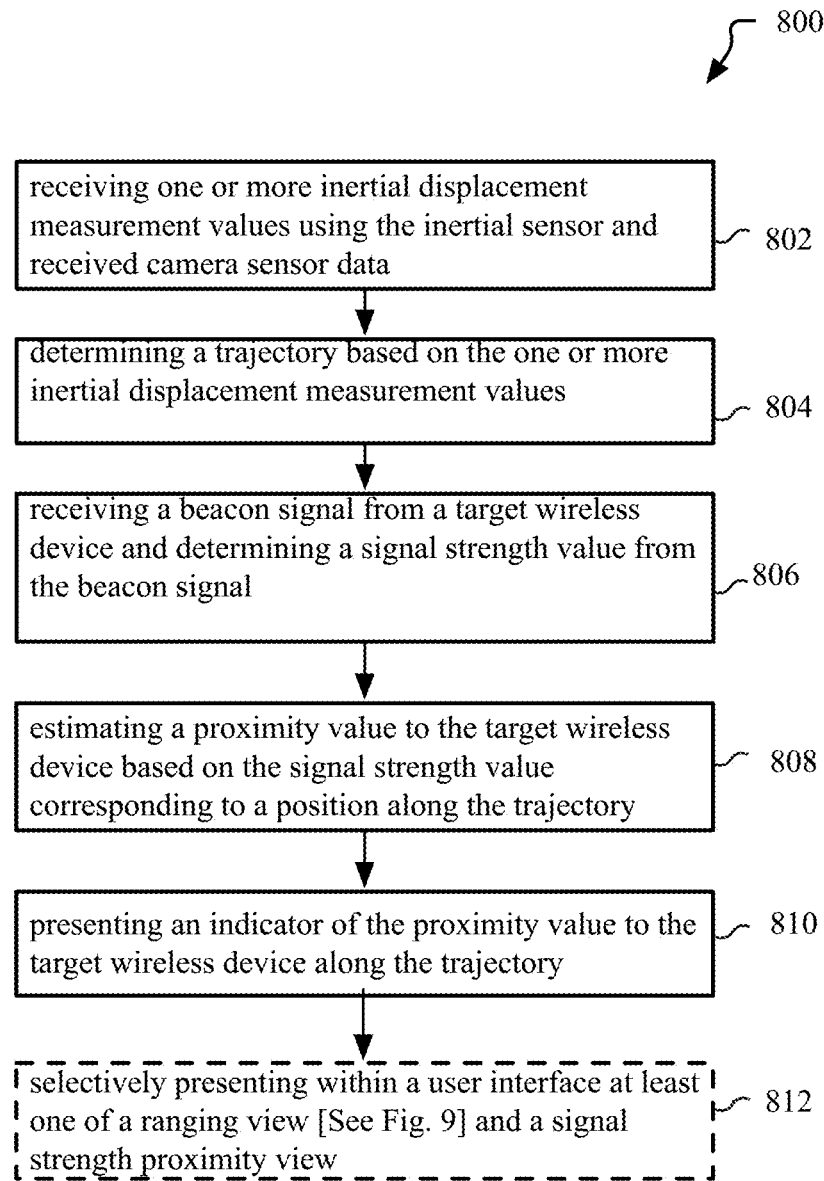
FIG. 8 is a flowchart illustrating a method for a device locator user interface in an embodiment.

FIG. 8 is a flowchart 800 illustrating a method for a device locator user interface 204 in an embodiment. One or more inertial displacement measurement values may be determined with using received inertial sensor data and received camera sensor data (802). The one or more inertial displacement measurements are determined from an origin within an arbitrary 2D or 3D coordinate system using VIO. In an embodiment, the origin (e.g., ([0,0,0] x,y, and z axis)) is established when the user selects to initiate the process to find the target wireless device 201. The target wireless device may be the wireless accessory device 201 and/or wireless accessory device 101 as shown in FIGS. 1-3. A trajectory may be determined based on the one or more inertial displacement measurement values (804) collected. The displacement measurement values from the origin collected as the user moves within the location environment and the displacement measurements may be used to plot the trajectory in the user interface 204 to represent the path taken by the user within a location environment. The trajectory may be presented within the user interface to alert the user of the path the user has already taken, so the user may use the information to attempt other routes or maintain a route to locate the device.

A beacon signal may be received from the target wireless device 201 (806). The mobile device 102 may receive beacon signals from the target wireless device 201 with one or more advertisements prior to establishing a wireless radio connection and/or while the target wireless device 201 has established the wireless radio connection to the mobile device 102. Bi-directional communication may not be established between the mobile device 102 and target wireless device 201, but the received advertisements by the mobile device 102 may be used to determine proximity to the target wireless device 201. A signal strength value may be determined from the received beacon signal (806). The signal strength value may be an average of signal strength measurement values determined from advertisements in the beacon signal received while the user is positioned in an area on the trajectory. In some embodiments, the average of signal strength values taken over the area (e.g., as opposed to taken over time) may reduce the effects of fading. Fading occurs when beacon signals received at the wireless radio receiver on mobile device 102 contemporaneously cause a dip in signal strength values. Alternative embodiments may use an average of signal strength values taken over time. A proximity value to the target wireless device 201 may be estimated based on the signal strength values corresponding to a position along the trajectory (808) within the area where signal strength values have been received.

An indicator of the proximity value to the target wireless device may be displayed along the trajectory (810). A defined category for the signal strength value may be determined for each set of one or more signal strength values that are averaged for an area along the trajectory and the indicator of the proximity value may be presented in accordance with the defined category. For example, a range of values may be defined for each of a set of buckets to designate close, near, and far categories and/or any other categories that provide information to the user for the proximity to the wireless accessory device 201. The visual indicator may be any type of user interface element, including, but not limited to, the following: a marker, a particular color or gradient, a shape, or any other visual indication may be displayed on the user interface.

Figure 21:
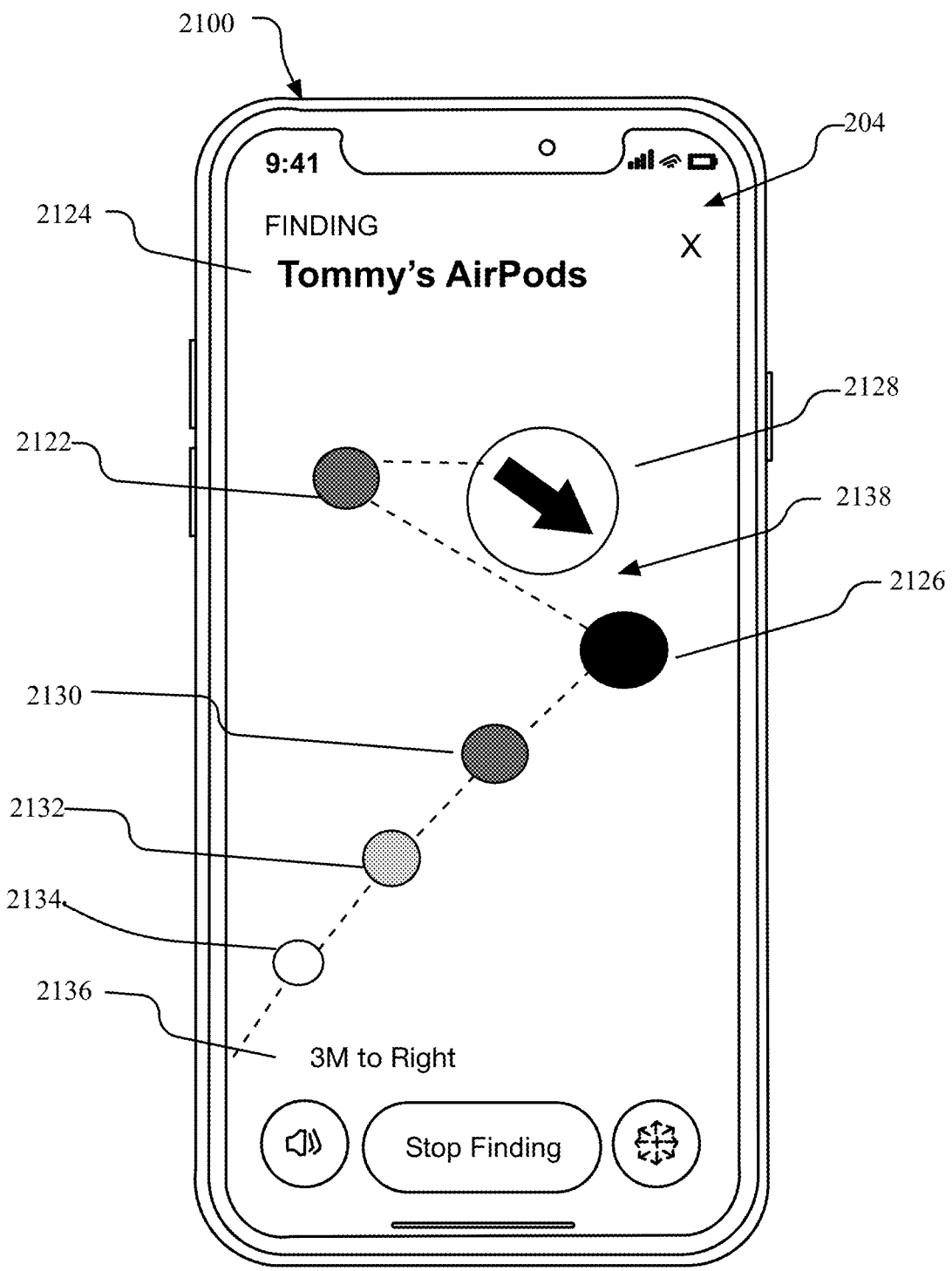

A ranging view, a signal strength proximity view, and/or a combination of the ranging and signal strength proximity view (as shown in FIG. 21) may selectively be presented within a user interface (812). By way of example, the ranging view may only be shown when the wireless radio connection has been established.

Ranging View

Performance and accuracy of the distance, bearing, and range calculations can be enhanced using various algorithmic approaches. In one scenario, as the device traces out a trajectory through space towards a target, the device may encounter multipath signal propagation effects when ranging to the target. Multipath propagation is a phenomenon that results in radio signals reaching a receiving antenna by two or more paths. Multipath propagation can occur if the line of sight to the target is obscured by obstacles in the environment, the antenna pattern severely attenuates the line of sight signal, or the users themselves block the signal. As the mobile device traces a trajectory through space towards the target, the measured range to the target can evolve over time, along with the distance traveled over the trajectory. During this evolution, anomalies and interference may arise.

At times the measured range determined from the sensor data may appear to jump more than the distance traveled through space. A sudden increase in the measured range that differs from the distance travelled over a period of time may be used to determine when the multipath conditions have changed. When the change in range is positive and larger than the distance traveled, the bias on the measurement due to multi path may have increased. Similarly, when the change in range is negative and larger in magnitude than the distance traveled, a multi path component likely existed before and has reduced in effect. When multipath propagation is detected to have decreased, the uncertainty of previous measurements can be increased to account for the potential multi interference. In one embodiment, previous measurements that have been deemed as multipath measurements may be removed from the measurement history by setting the weights associated with those measurements to zero. When multipath interference is detected to have increased, the measurements received after the detected increase can similarly be de-weighted or those measurements can be rejected.

In one embodiment range measurements can be de-weighted due to the passage of time. As range measurements are gathered over the device's trajectory, the solution for the target's position becomes overdetermined. Range measurements can be de-weighted as the measurements age and/or as VIO errors accumulate. In the case of a moving target, analysis of range measurements as a function of time may be particularly important, as a time series of range measurements can be used to determine an angle measurement to the device without relying on angle measurements associated with any one ranging operation. Thus, the weights associated with older measurements may be decayed based on a time function.

In one embodiment, range measurements can be de-weighted due to the measured and/or estimated distance to target. As measurements indicate further ranges, the possibility of multipath interference increases, and the measurements become less useful. As a solution is formed, the estimated distance to each position where a measurement was formed can be calculated. Based on that distance, the measurement can be reweighed. Additionally, the measurement itself is a range, and can be used to infer a measurement uncertainty.

In one embodiment, angle of arrival measurements can be used to further refine the target position when a range-only solution indicates the target is in the device's field of view. A position solution for the device can be formed using ranging measurements only (e.g., without angle measurements). Given the position solution, probabilities can be calculated that each of the angle measurements was made from the mobile device when the target was in the device's field of view. If the probability meets a threshold, the angle measurement can be used to form a new position solution. Use of the angle measurement can resolve ambiguities that may be present in the range solution, especially along the z axis, due to the device trajectory mostly being in a single plane (e.g., xy plane).

After measurements are used to form the position solution, the measurement errors of individual contributing measurements can be calculated. In an over determined solution, the measurement errors will be non-zero and give some indication of the quality of the position fix. If large errors are seen, the confidence in the position fix can be decreased. A threshold on the confidence can be used to determine if the position should be shown to the user. If all measurements are seen to disagree by small amounts, the errors can be used to increase the uncertainty of the position.

Figure 9:
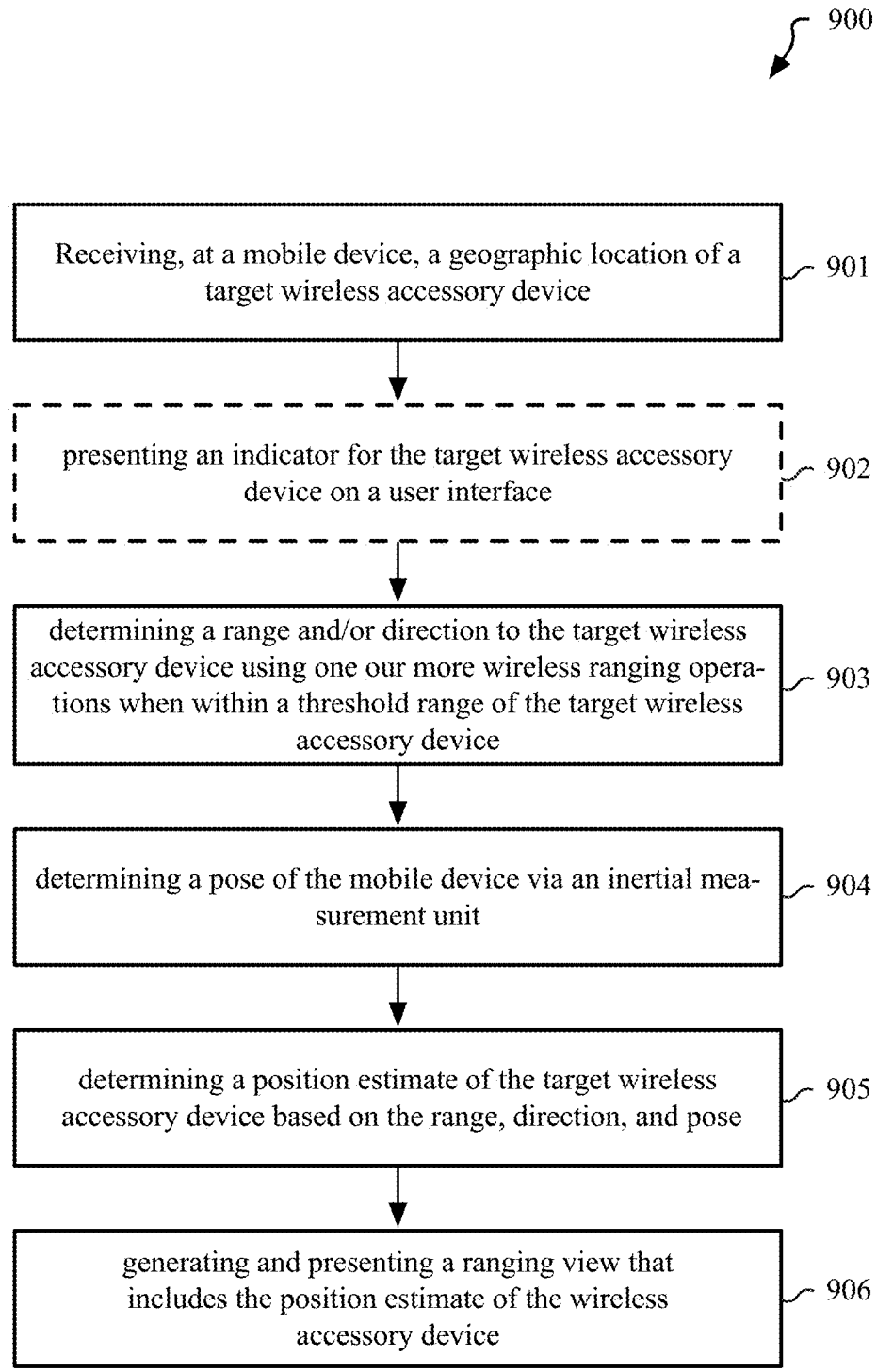
FIG. 9 illustrates a method to enable proximity enhanced user interfaces for a device locator application.

FIG. 9 illustrates a method 900 to enable proximity enhanced user interfaces for a device locator application. Method 900 includes operations by which range measurements determined by a wireless controller can be fused with pose estimates determined based on sensor data from an IMU to generate pose aligned measurements and three-dimensional or two-dimensional target position estimates. In some embodiments, the three-dimensional target position estimates can be used to enable an AR view of a location environment that includes a target device or item to be located. Range measurements determined by a wireless controller and estimates determined based on sensor data from an IMU may also be used to determine two-dimensional target position estimates. Method 900 can be performed by a mobile device (e.g., mobile device 102) as described herein to locate a target wireless accessory device (e.g., wireless device 101) or a target wireless accessory device (e.g., wireless accessory device 201) described herein, or an item associated with a wireless accessory device 201, such as an item that is tagged with a beacon or locator tag.

In one embodiment, method 900 includes operations to optionally receive, at a mobile device 102, a geographic location of a target wireless accessory device (901). The geographic location for the target wireless accessory device 201 can be a location determined by a mobile device 102 that can access a user account of the mobile device 102, or a location received from a device locator server 203.

The mobile device 102 can then present an indicator for the target wireless accessory device 201 on an interface of a device locator application 204 that is executed by the mobile device 102 (902). The indicator can be a map indicator that shows a location of the target wireless accessory device on a map of the nearby environment. For example, a map with a map indicator may be presented as shown in FIGS. 17-20. A distance and range measurement to the target wireless accessory device 201 can be presented on the map, along with the map indicator that shows the location of the target wireless accessory device. The user of the mobile device 102 can then move towards the location of the target wireless accessory device 201.

When the mobile device 102 is within a threshold range of the target wireless accessory device 201, the wireless accessory device 201 can determine a range and/or direction to the target wireless accessory device 201 using one or more wireless ranging operations (903). The one or more ranging operations can include continuous or periodic ultra-wideband ranging operations. The ultra-wideband ranging operations can be performed in conjunction with other range determination techniques, such as RSSI-based distance determinations. In one embodiment the ultra-wideband ranging operations are secure ranging operations in which the ranging packets exchanged are encrypted. In one embodiment, both range and direction determinations can be made based on the one or more ranging operations. In one embodiment, range-only determinations can be made and the direction may be determined based on analysis of multiple range measurements. Where both range and angle measurements may be determined based on instantaneous wireless ranging signal analysis, a history of range measurements can be used to increase the accuracy of the determined angle measurements.

The mobile device 102 can then determine a pose of the mobile device 102 via sensor data received from an inertial measurement unit within the mobile device 102 (904). The inertial measurement unit data can be processed by the system to determine the pose of the mobile device 102. The pose data can be used to further enhance the direction determinations made for the target wireless accessory device 201 based on wireless ranging sensors.

The mobile device 102 can then determine a position estimate of the target wireless accessory device 201 based on the range, direction, and pose (905). In one embodiment the specific range, direction, and pose determined for the target wireless accessory device 201 and the mobile device 102 is determined based on a fusion of sensor data from the wireless ranging system and the system of the mobile device 102. The position estimate may be a position relative to the mobile device 102 or an absolute position within a 3D and/or 2D coordinate space. The mobile device 102 can then generate and display a device locator UI 204 that includes the position estimate of the wireless accessory device 201 (906). The device locator UI can be a ranging view, for example, as shown in FIG. 21, with a distance 2116 and direction information 2108 to the wireless accessory device 201. The proximity view, also shown in FIG. 21, provides a trajectory in 2D coordinate space with visual indicators for the proximity to the target wireless accessory device 201 as determined by signal strength measurements.

Figure 10:
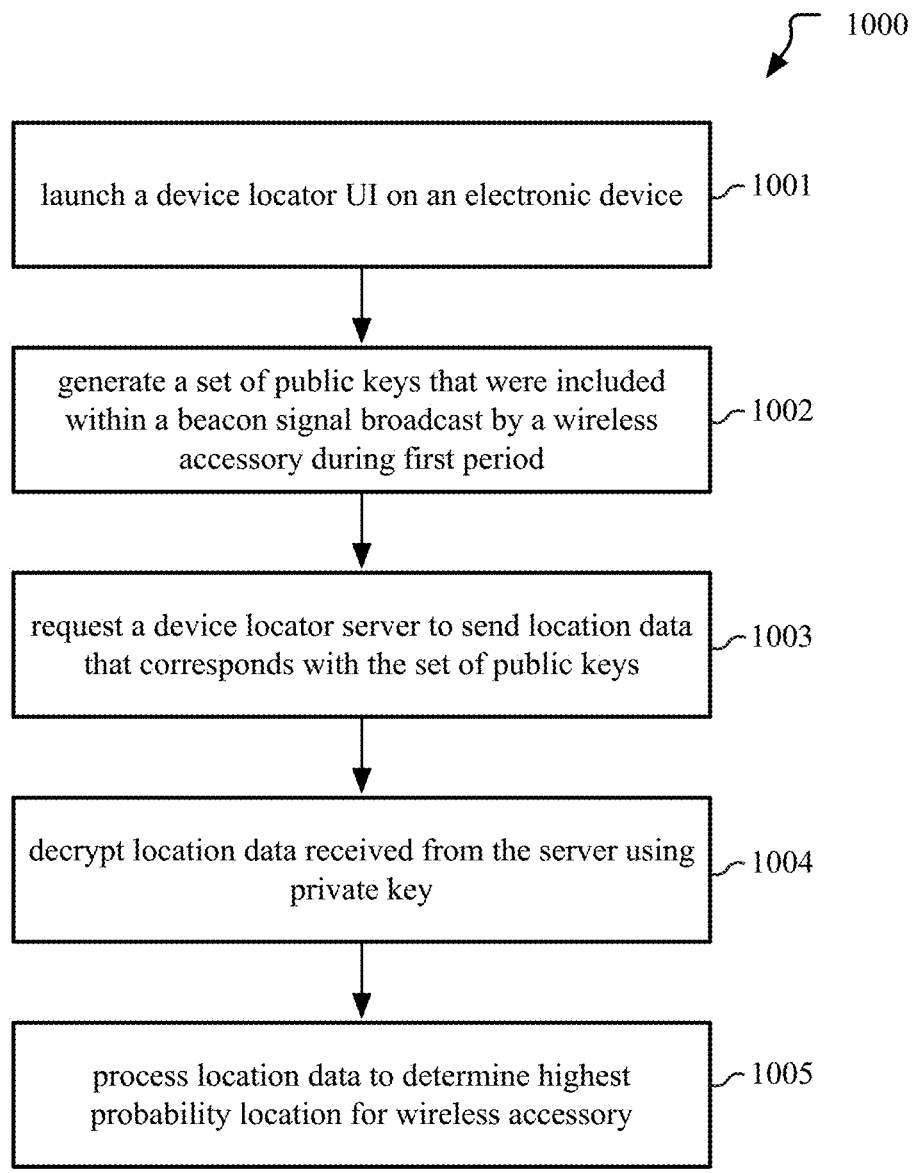
FIG. 10 illustrates a method to determine a location for a wireless accessory via a device locator server.
Figure 11:
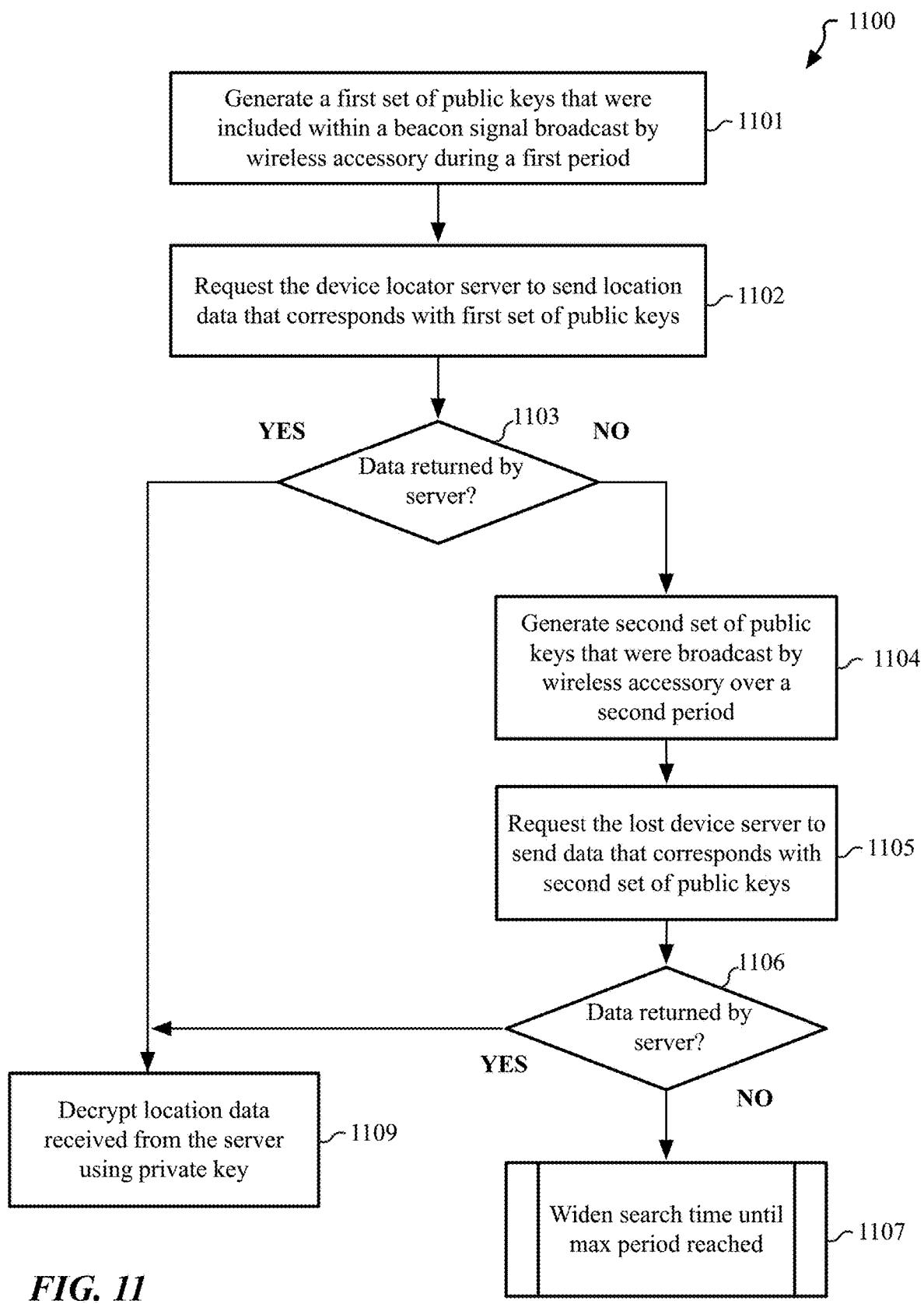
FIG. 11 illustrates an additional method to determine a location for a wireless accessory via a device locator server.

FIG. 10 illustrates a method 1000 to determine a location for a wireless accessory via a device locator server. FIG. 11 illustrates an additional method 1100 to determine a location for a wireless accessory via a device locator server. As shown in FIG. 10, method 1000 includes an operation in which an electronic device launches a device locator UI (1001). In response to launching the device locator UI, the electronic device, which can be a mobile device as described herein, or another electronic device associated with the same cloud services account as the mobile electronic device, can perform an operation to generate a set of public keys that were included within a beacon signal broadcast by a wireless accessory during a first period (1002). The first period can be, for example, a previous 24 hours. The electronic device is aware of the frequency in which the wireless accessory is to generate new public keys and, using a shared secret generated with the wireless accessory, can generate a set of public keys that correspond with the keys that were generated by the wireless accessory over the first period. The electronic device can then send the set of public keys within a request for the device locator server to send location data that corresponds with the set of public keys (1003). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (1004). The electronic device can then process the location data to determine the highest probability location for the wireless accessory (1005). In an embodiment, the location data may include data for accessory devices 201 in the device group.

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory. Data that can be transmitted by a finder device and used for location processing is shown in FIG. 12 and described below.

As shown in FIG. 11, method 11 includes operations that can be performed if the device locator server does not have location data to provide to the electronic device in response to a request. In the case of a device group, the electronic device (e.g., mobile device 102) may provide the location data on devices in the device group. The electronic device can generate a first set of public keys that were included within a beacon signal broadcast by wireless accessory during a first period (1101). The first period can be, for example, 24 hours, although other initial search periods can be used. The electronic device can perform a subsequent operation to request the device locator server to send location data that corresponds with first set of public keys (1102). If the data is returned by the server (1103, "yes"), the electronic device can decrypt the location data received from the server using the private key that corresponds with the set of public keys (block 1109).

If data is not returned by the server (1103, "no") the electronic device can generate a second set of public keys that were included within a beacon signal broadcast by the wireless accessory during a second period (1104). The second period can be the 24, 48, or another number of hours before the first period. The electronic device can then request for the device locator server to send data that corresponds with the second set of public keys (1105). If, in response to the request, data is returned by the server (1106, "yes"), method 1100 can proceed to block 1109, in which the electronic device decrypts the received data. If data is not returned by the server (1106, "no"), or the server sends a reply that indicates data is not available, method 1100 includes for the electronic device can widen the search time by requesting successively older time periods until the max period is reached (1107).

Figure 12:
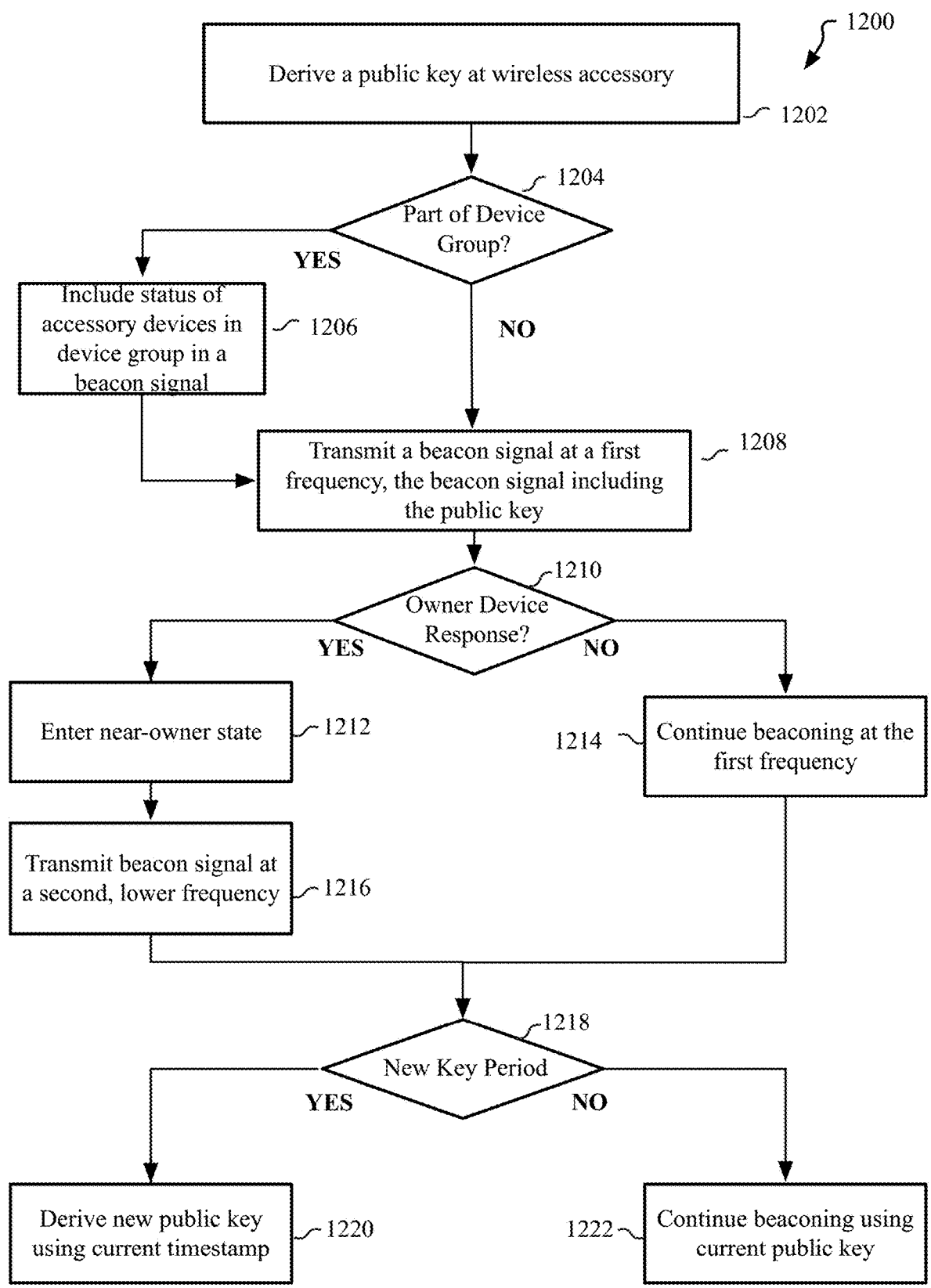
FIG. 12 is a flow diagram illustrating a method of broadcasting a signal beacon at a wireless accessory, according to an embodiment.

FIG. 12 is a flow diagram illustrating a method 1200 of broadcasting a signal beacon at a wireless accessory, according to an embodiment. Aspects of method 1200 are also illustrated in FIG. 2 and FIG. 3. Method 1200 includes for the wireless accessory to derive a public key (block 1202). The public key can be derived based on a shared secret and a timestamp determined based on a clock or time keeping device of the wireless accessory. Optionally, a determination is made as to whether the wireless accessory is part of a device group (1204). If the wireless accessory is part of a device group, the status information and/or verifiable information for other accessory devices 201 in the device group is provided in the beacon signal (1206). The wireless accessory may indicate status information and/or verifiable information, such as whether any other wireless accessory in the device group is proximate, connected (physically or wirelessly), and/or any other information on the other wireless accessories in the device group 105. In an embodiment, a set of bits included in the beacon signal may represent each accessory in the device group and setting a Boolean value (e.g., true (1) or false (0)) may indicate whether the respective accessory is proximate and/or connected to the accessory device sending the beacon signal. Alternatively, information is not provided on a device group, if the wireless accessory is not part of a device group (1204). The wireless accessory can then transmit a beacon signal at a first frequency, where the beacon signal includes the public key (1208). The first frequency can vary, and in one embodiment is one beacon every two seconds.

After transmitting a beacon signal, the wireless accessory can listen for a response from the owner device (1210). If the wireless signal receives a response from the owner device (1210, "yes"), the wireless accessory can enter a near-owner state (1212) and begin to transmit the beacon signal at a second, lower frequency (1216). If the wireless accessory does not receive a response from the owner device (1210, "no"), the wireless accessory can continue beaconing at the first frequency (1214).

Method 1200 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (1218). While the wireless accessory has not entered a new key period (1218, "no"), the accessory can continue beaconing using the current public key (1222). When the wireless accessory detects that it has entered a new key period (1218, "yes") the accessory can derive a new public key using the current timestamp (1220). In one embodiment the new public key can be derived using an existing public key, a timestamp, and an anti-tracking secret.

Figure 13:
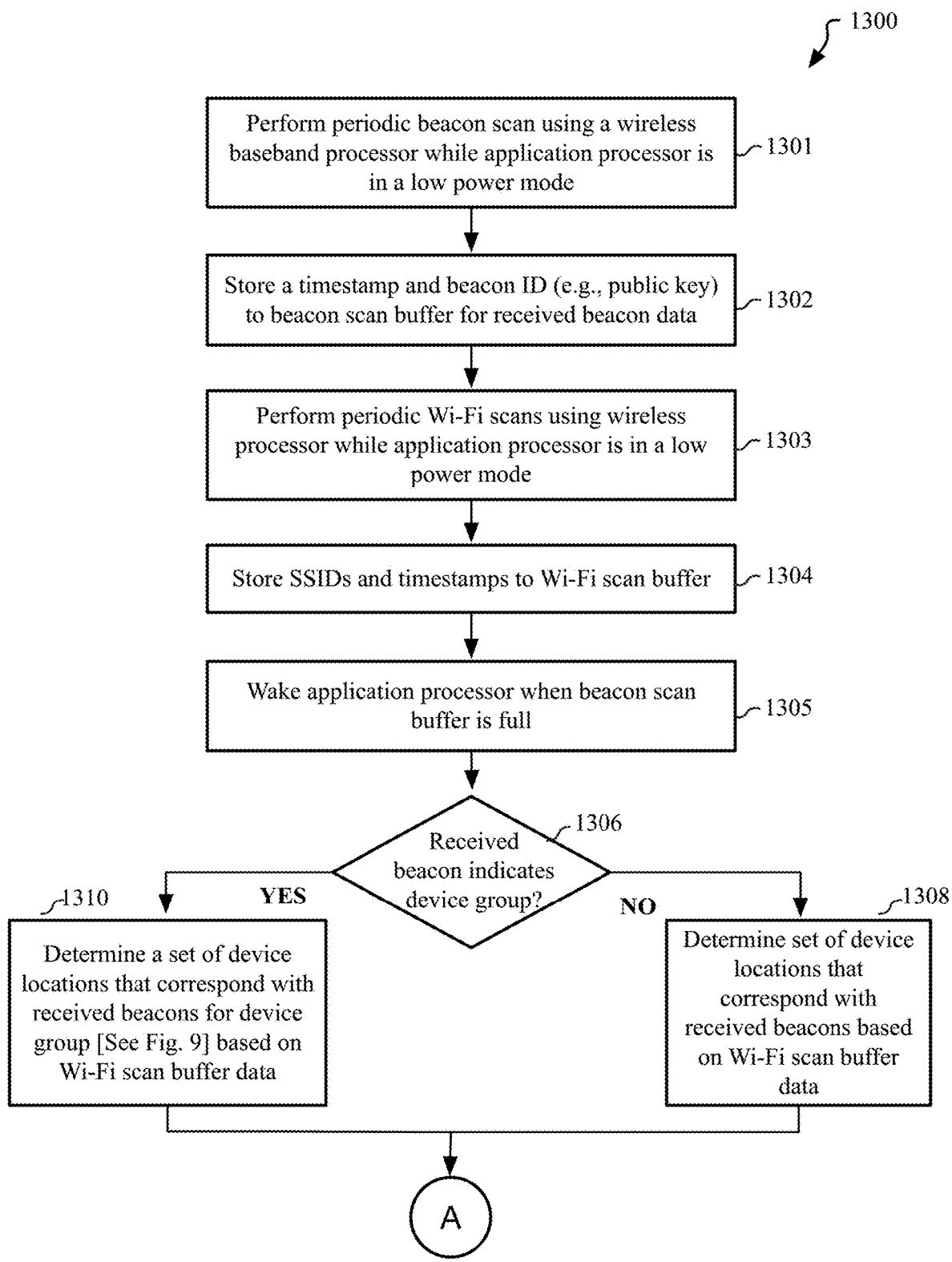
FIG. 13-14 illustrate operations of a method that can be performed by a finder device, according to embodiments described herein.
Figure 14:
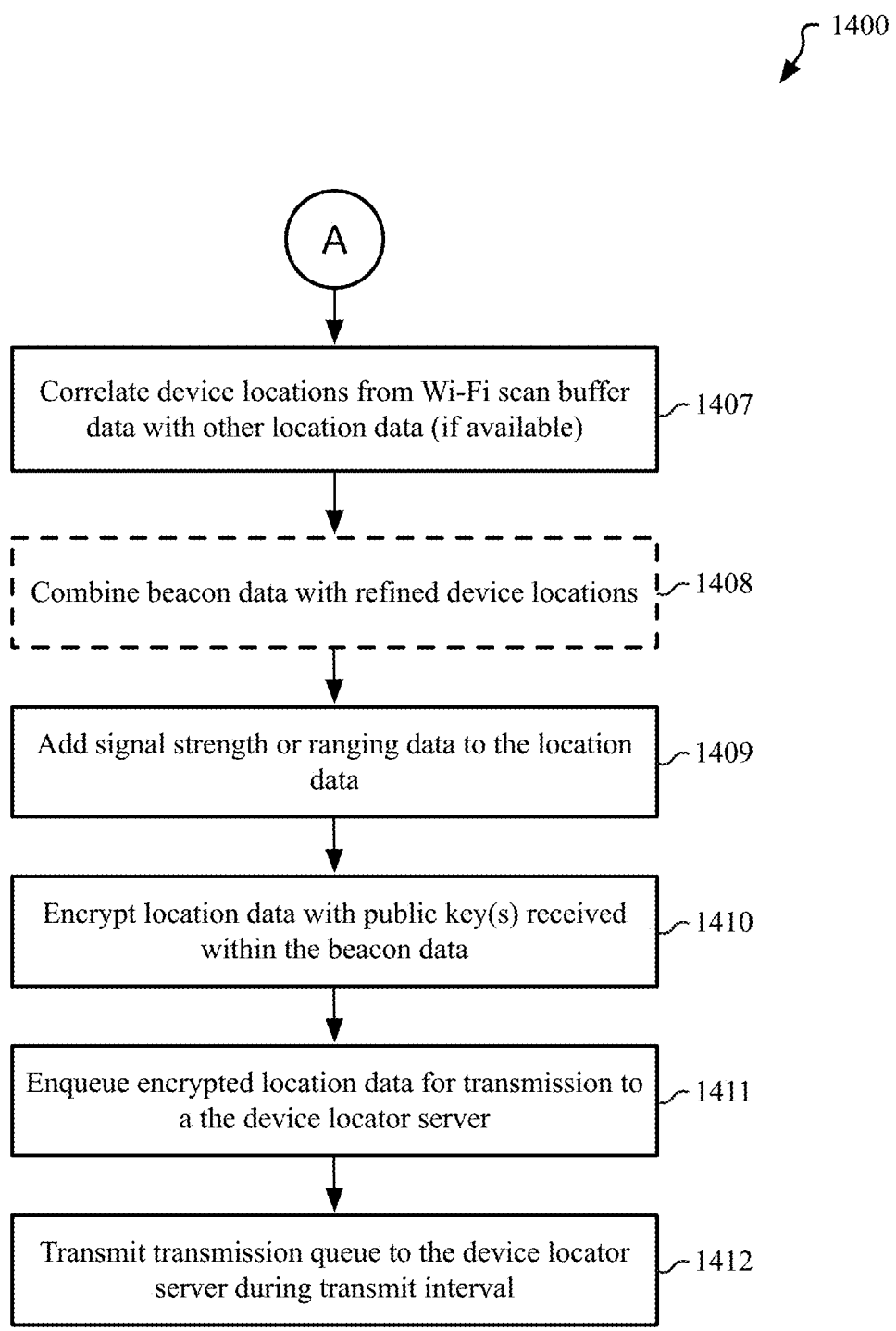

FIG. 13-14 illustrate operations of a method 1300 that can be performed by a finder device, according to embodiments described herein. Aspects of method 1300 are also illustrated in FIG. 2 and FIG. 3.

As shown in FIG. 13, method 1300 includes for the finder device to perform a periodic beacon scan using a wireless baseband processor while an application processor of the finder device is in a low power mode (1301). While the beacon scan can also be performed when the application processor is active, beacon scans can be performed by the wireless processor and a wireless radio receiver as a low power operation while the finder device is idle, inactive, or otherwise in a low power state. The finder device can store a timestamp and a beacon identifier to a beacon scan buffer for any beacon data received by the finder device (1302). The beacon identifier, in one embodiment, is a public key that is generated by the wireless device based on a timestamp and a shared secret generated with the mobile device of the owner.

Method 1300 additionally includes for the finder device to perform periodic Wi-Fi scans using the wireless processor while application processor is in a low power mode (1303). While the Wi-Fi scans can also be performed when the application processor is active, Wi-Fi scans can be performed by the wireless processor and a wireless radio receiver as a low power operation while the finder device is idle, inactive, or otherwise in a low power state. The finder device can then store Wi-Fi service set identifiers (SSIDs) and scan timestamps to a Wi-Fi scan buffer on the finder device (1304).

In one embodiment, the Wi-Fi scan buffer is a rolling buffer that stores the most recently detected SSIDs, while overwriting older detected SSIDs. In one embodiment the beacon scan buffer can be a fixed-size buffer having space for a pre-determined number of entries. The finder device can wake the application processor when the beacon scan buffer becomes full (1305) and correlate those beacon scan with the most recently detected SSIDs in the Wi-Fi scan buffer. If the beacon indicates a beacon signal was received from a device group (1306), then a set of device locations that correspond with received beacons based on Wi-Fi scan buffer data may be performed for beacon signals from the device group (1310). For example, if a beacon signal is received from a first accessory device from a device group 105 and includes information on a set of proximate devices that are either physically or wirelessly connected to the first accessory device, then the last known location for the first accessory device may be attributed/stored to the first accessory device and each of the proximate devices in the device group 105. Alternatively, that correlation can enable the finder device to determine a set of device locations that correspond with received beacons based on Wi-Fi scan buffer data (1308).

Method 1300 continues in FIG. 14 and includes for the finder device to correlate device locations from the Wi-Fi scan buffer data with other location data if other location data is available (1407), to generate refined device locations. If refined device locations are generated, the finder device can optionally combine the beacon data with refined device locations (1408). The finder device can also add signal strength (RSSI) and/or ranging data to the location data (1409). The signal strength and ranging data (e.g., UWB ranging data) can be gathered when the beacon signal is received by the finder device. The finder device can then encrypt the location data with one or more public keys received within the beacon data (1410). The signal and ranging data may be encrypted along with the location data or can be send unencrypted along with the encrypted location data. The finder device can enqueue encrypted location data for transmission to the device locator server (1411). The device locator server can be one of multiple cloud services servers to which communication is generally performed in a batched and throttled manner. A batch of encrypted data can be gathered and placed in the transmission queue until a transmit interval arrives, during which the finder device can transmit data to the cloud services servers (1412).

Figure 15:
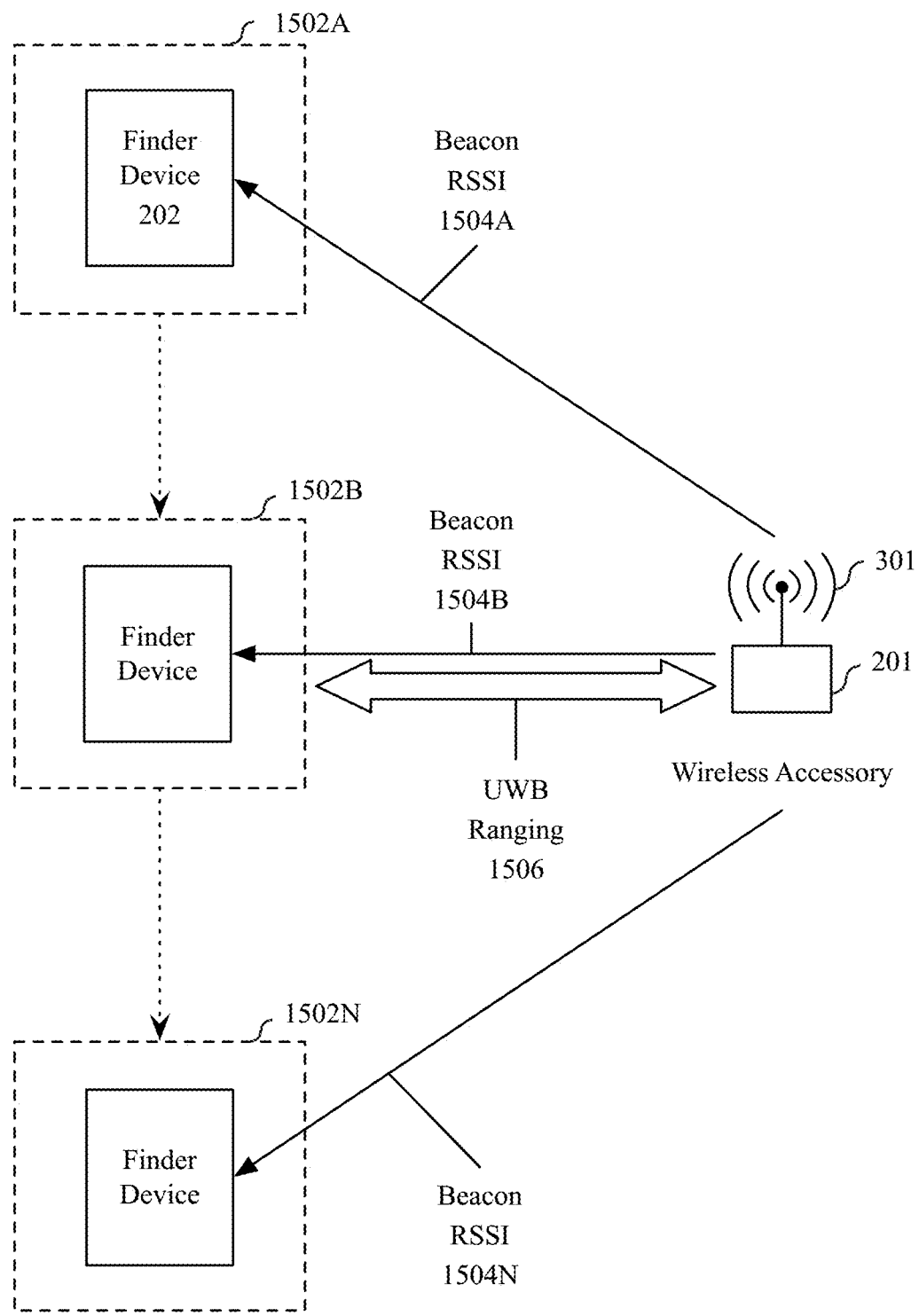
FIG. 15 illustrates the gathering of signal and ranging data by a finder device, according to an embodiment.

FIG. 15 illustrates the gathering of signal and ranging data by a finder device, according to an embodiment. In one embodiment, the finder device 202 can gather signal strength information (e.g., RSSI 1504A-1504N) for a beacon signal 301 received from the wireless accessory 201 across multiple locations 1502A-1502N. The finder device 202 can also represent multiple finder devices, such as the set of finder devices 303 in FIG. 3, where each finder device detects the beacon signal at a different location. Each finder device 202 can send different locations and signal strengths and the location and signal strength data received from the multiple finder devices will be aggregated by the device locator server. In one embodiment, where a finder device and the wireless device each include UWB radios, UWB ranging 1506 can be performed if the finder device and the wireless device are within range of UWB transmissions. UWB ranging and signal strength data can be transmitted along with location data for the finder devices to the device locator server.

The owner device can retrieve the RSSI and/or UWB information from the device locator server along with location data, which in one embodiment is provided the form of latitude and longitude information, along with timestamps for which the locations were determined. The owner device can then use the location data, timestamps, and signal information to triangulate a most probable location for the wireless accessory 201.

Figure 16:
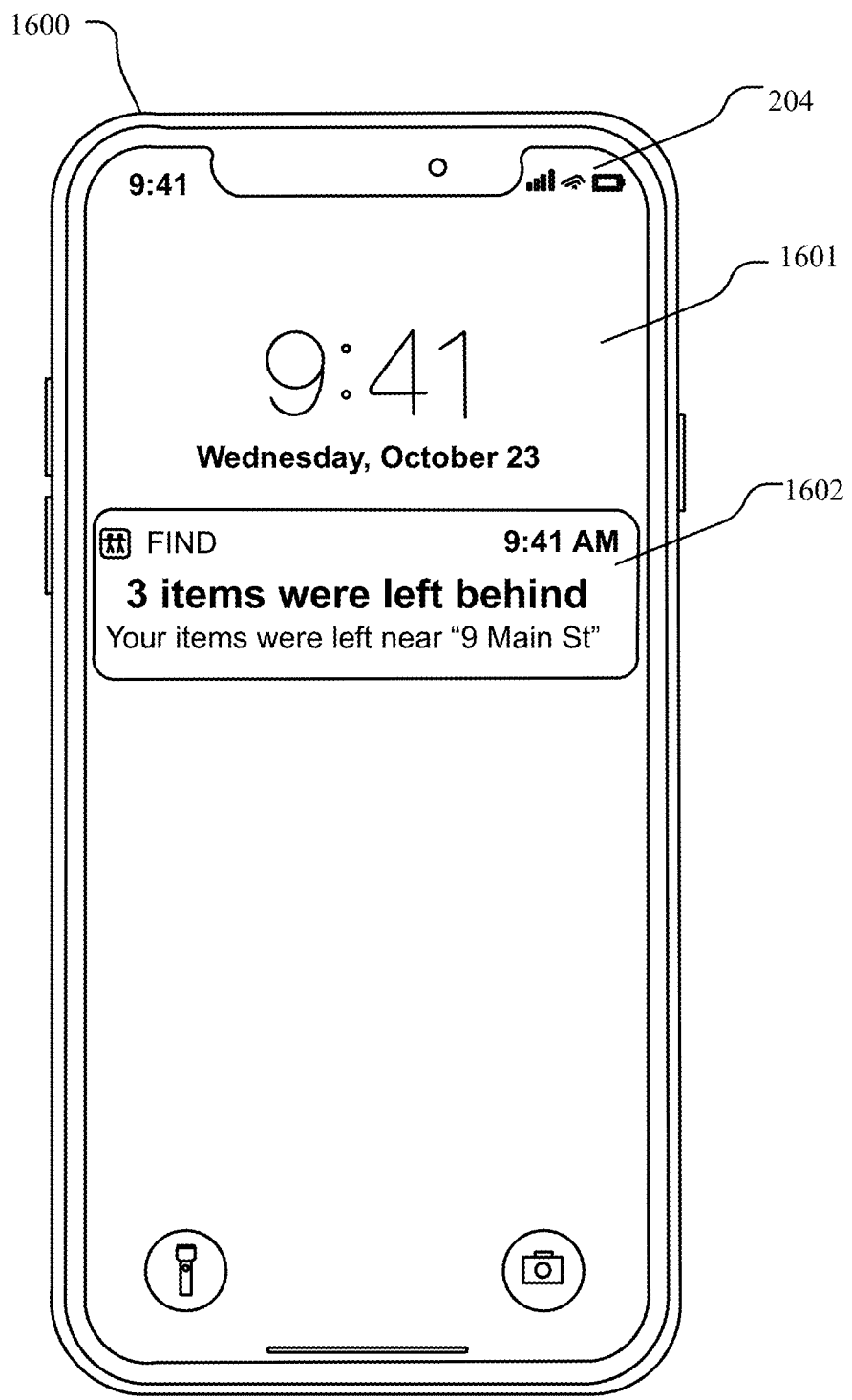
FIGS. 16-21 illustrate device locator user interfaces, according to one or more embodiments.
Figure 17:
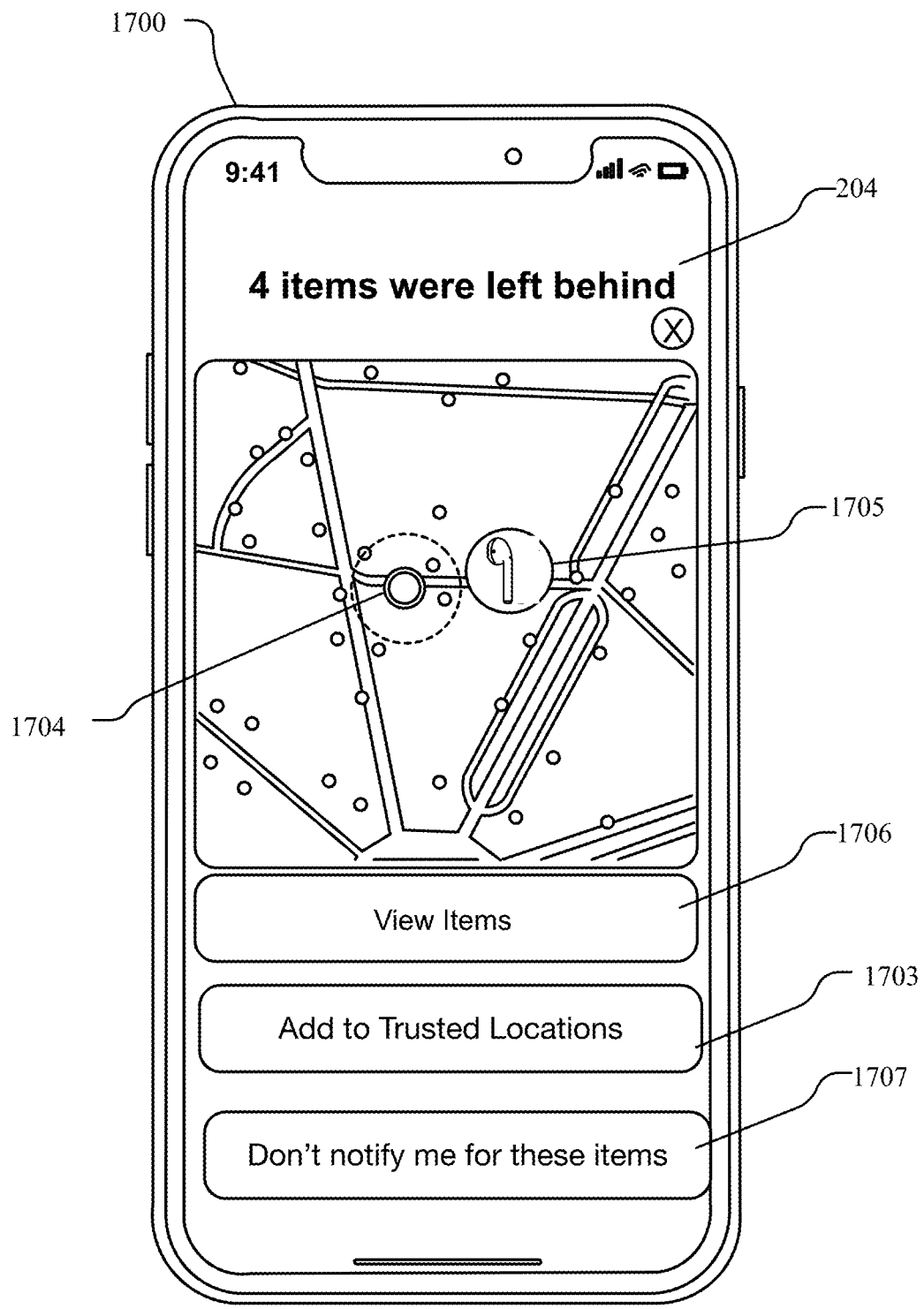

FIG. 16-21 illustrate a device locator UI 204, according to an embodiment. FIG. 16 shows a first graphical user interface of the device locator UI 204, according to an embodiment, which shows a notification for various wireless accessories of a user. The device locator UI 204 can cause the presentation of separation notifications 1602 on the home screen 1601 of the electronic device 1600. FIG. 17 shows a second graphical user interface of the device locator UI 204, according to an embodiment, which enables an accessory device left behind to be viewed on a map, add trusted location, or request cease notifications for items.

Figure 18:
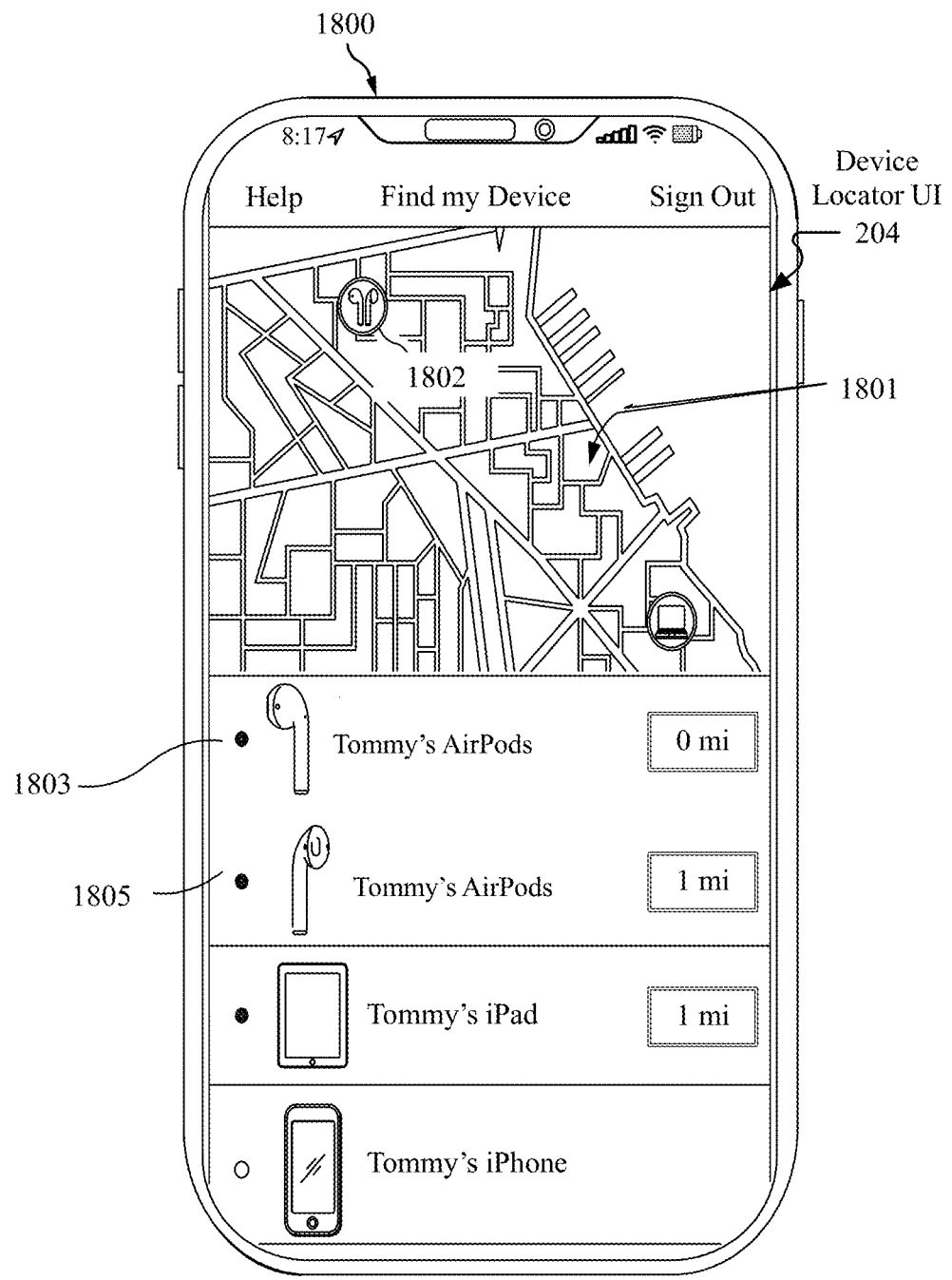
Figure 19:
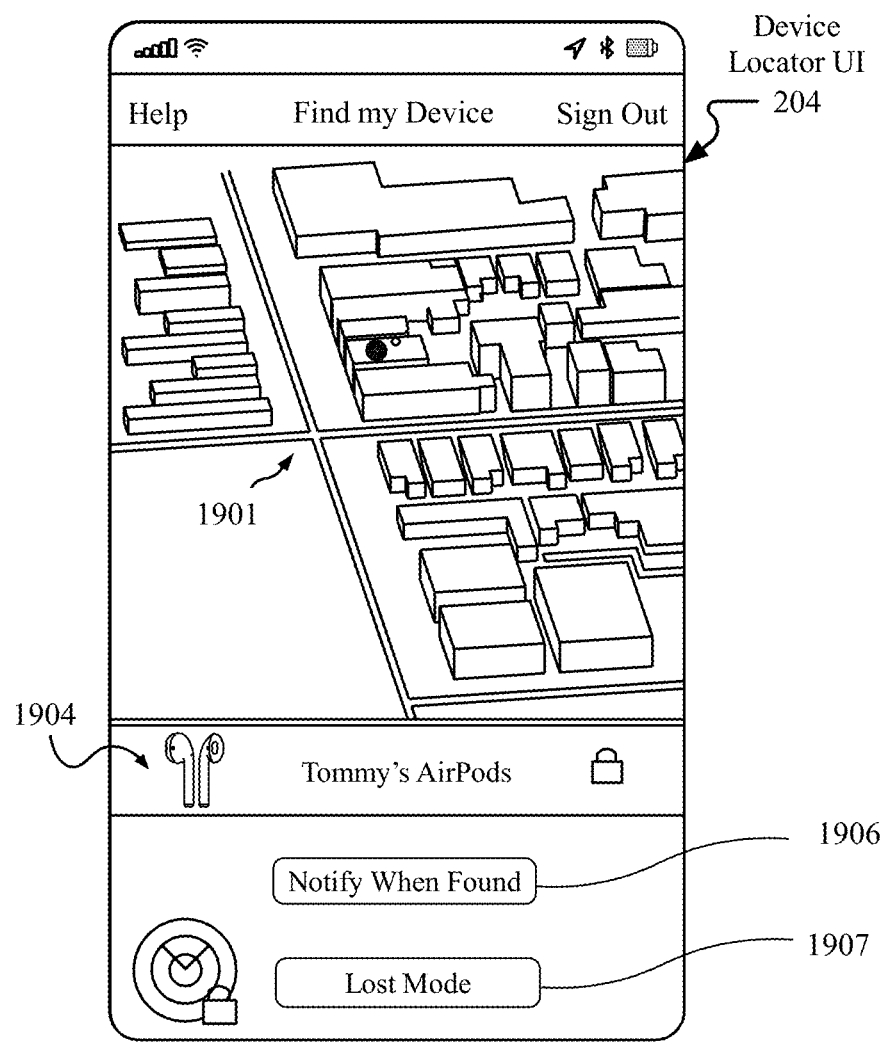
Figure 20:
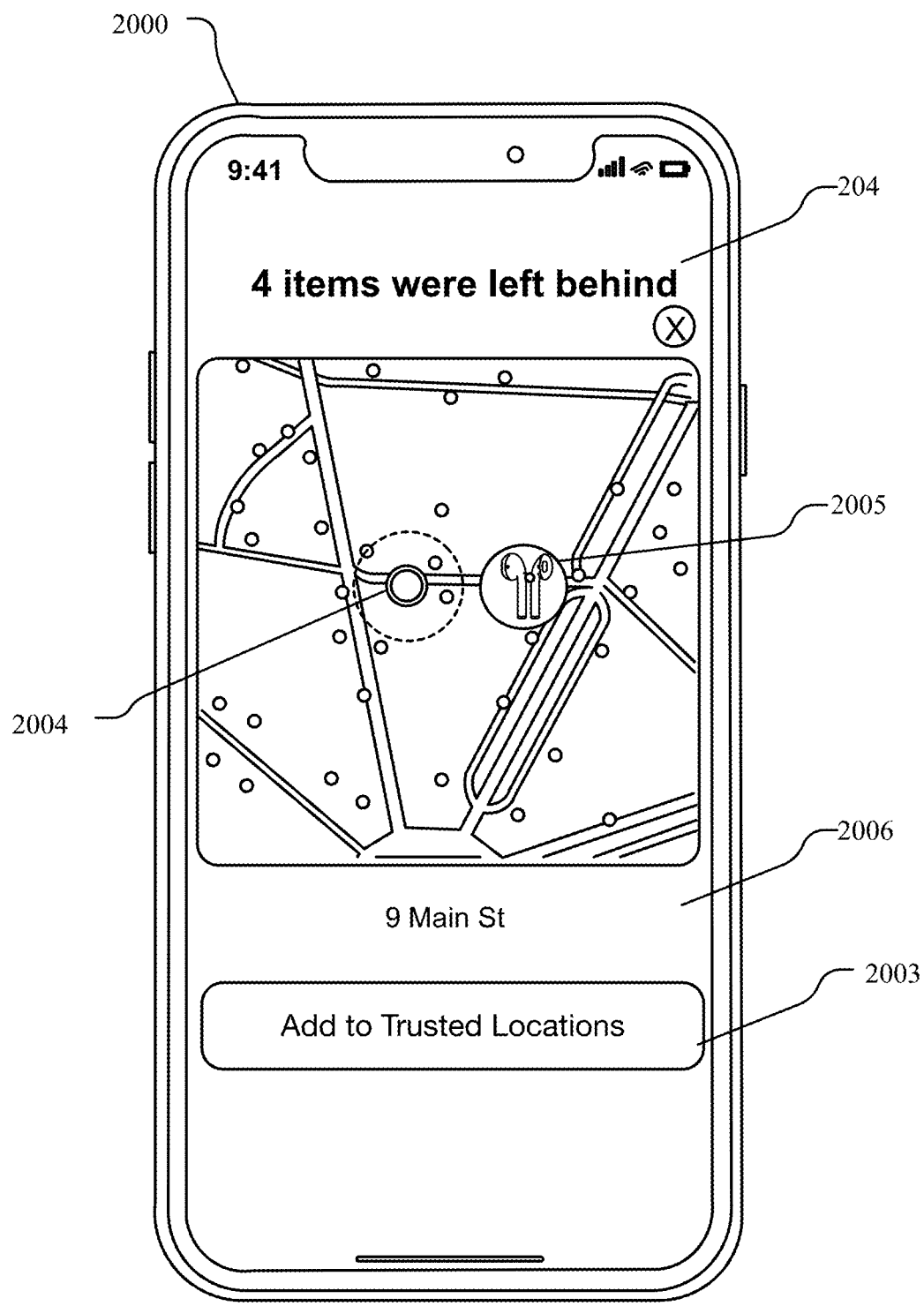

FIG. 18 shows a third graphical user interface of the device locator UI 204, according to an embodiment, which enables accessory devices 201 including devices in a device group to be found in a map. FIG. 19 shows a fourth graphical user interface of the device locator UI 204, according to an embodiment, which enables a wireless accessory to be set to a lost mode or notify when found. The device locator UI 204 can be displayed on an electronic device, which can be a mobile device 102, or any other type of electronic device described herein. FIG. 20 shows a fifth graphical user interface of the device locator UI 204, according to an embodiment, which enables a wireless accessory to add trusted locations. FIG. 21 shows a sixth graphical user interface of the device locator UI 204, according to an embodiment, which enables a proximity view using signal strength measurements.

As shown in FIG. 17, the device locator UI 204 can present a unified graphical interface on electronic device 1700 through which multiple different types of devices and accessories can be located, including wireless devices with network or cellular access and wireless accessories without native network access. The device locator UI 204 can include a map 1704 with a marker 1705 that shows the current or last known location of a wireless accessory device 201. The marker 1705 can be an icon, image, graphic or any other user interface element that identifies the accessory and conveys a location for the accessory. A selectable element 1707 in the device locator UI 204 can present an option to request not to be notified about particular items. A selectable element 1706 in the device locator UI 204 can present a description or name of the wireless device or accessory and can show an estimated distance between the wireless device or accessory and the current location of the electronic device 1800 as shown in FIG. 18.

As shown in FIG. 18, the device locator UI 204 can present a user interface that enables a wireless accessory view the item 1803 and 1805 as well as the distance from electronic device 1800. The third user interface can be displayed, in one embodiment, in response to the selection of the selectable element 1706 shown in FIG. 17. The third user interface can present a user interface element 1802 that represents and/or describes the wireless accessory in question, as well as the map 1801 and marker 1802 that show the current or last known location of the wireless accessory.

As shown in FIG. 19, the device locator UI 204 can present a fourth graphical user interface that enables a wireless accessory to be set to a lost mode. In one embodiment, when a wireless accessory cannot be located via the device locator UI 204, the map 1901 will not display a marker that indicates a location for the accessory. The device locator UI 204 can present the user interface element 1904 that represents and/or describes the wireless accessory in question and a set of selectable user interface elements. One selectable user interface element 1906 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user.

Another selectable user interface element 1907 can place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

As shown in FIG. 20, the device locator UI 204 can present a fifth graphical user interface in electronic device 2000 that enables a designation of a known location 2006 shown on map with 2004 to become a trusted location with selection of selectable element 2003. The fifth user interface can be displayed, in one embodiment, in response to the selection of the selectable element 1703 shown in FIG. 17. The device locator UI 204 can present the user interface element 2005 that represents and/or describes the wireless accessory in question.

As shown in FIG. 21, the device locator UI 204 can present a sixth graphical user interface in electronic device 2100 with a proximity view using signal strength measurements. The proximity view 2124 for finding "Tommy's AirPods" has indicators 2122, 2126, 2130, 2132, 2134, and 2128 at various positions along the trajectory 2138 within the user interface 204. Each indicator may be user interface element that represent proximity to target wireless accessory device 201 by size, color, shape, color gradient, shading, pattern, and/or any other technique for a visual indicator within a user interface. The indicators may be displayed along the trajectory 2138 as the user moves through the location environment. In the proximity view 2104, for example, indicator 2106 is closest to the target wireless accessory device 201 along the trajectory 2138 that the user has taken to find the target wireless accessory device 201 as represented by a darker color and/or a larger size as compared to the other indicators. In some embodiments, user interface 204 proximity view may present ranging information using ranging measurements and present an arrow 2128 indicating the direction of the target wireless accessory device 201 and the distance 2136 to the target wireless accessory device 201. In other embodiments, the ranging information may be presented within a separate user interface without the proximity indicators 2122, 2126, 2130, 2132, and 2134 as shown in FIG. 1B. In other embodiments, the trajectory may be shown in a grid, such as a hexagonal grid, with visual indicators consisting of areas of the grid designated with colors, gradients, shading, and/or any other marking along the trajectory plotted on the grid to represent the proximity values for signal strength observed in the respective areas.

Figure 22:
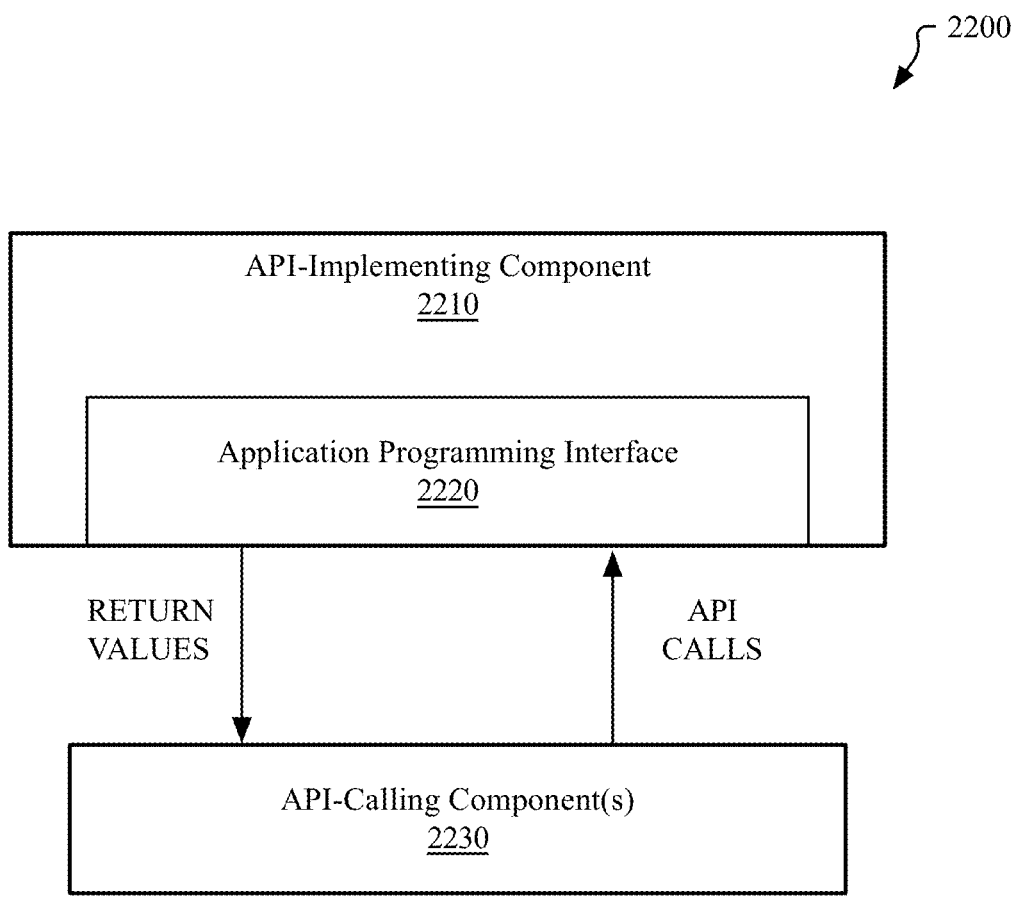
FIG. 22 is a block diagram illustrating an exemplary API architecture, which may be used in some embodiments.

FIG. 22 is a block diagram illustrating an exemplary API architecture, which may be used in some embodiments of the invention. As shown in FIG. 22, the API architecture 2200 includes the API-implementing component 2210 (e.g., an operating system, a library, a device driver, an API, an application program, software or other module) that implements the API 2220. The API 2220 specifies one or more functions, methods, classes, objects, protocols, data structures, formats and/or other features of the API-implementing component that may be used by the API-calling component 2230. The API 2220 can specify at least one calling convention that specifies how a function in the API-implementing component receives parameters from the API-calling component and how the function returns a result to the API-calling component. The API-calling component 2230 (e.g., an operating system, a library, a device driver, an API, an application program, software or other module), makes API calls through the API 2220 to access and use the features of the API-implementing component 2210 that are specified by the API 2220. The API-implementing component 2210 may return a value through the API 2220 to the API-calling component 2230 in response to an API call.

It will be appreciated that the API-implementing component 2210 may include additional functions, methods, classes, data structures, and/or other features that are not specified through the API 2220 and are not available to the API-calling component 2230. It should be understood that the API-calling component 2230 may be on the same system as the API-implementing component 2210 or may be located remotely and accesses the API-implementing component 2210 using the API 2220 over a network. While FIG. 22 illustrates a single API-calling component 2230 interacting with the API 2220, it should be understood that other API-calling components, which may be written in different languages (or the same language) than the API-calling component 2230, may use the API 2220.

The API-implementing component 2210, the API 2220, and the API-calling component 2230 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 23:
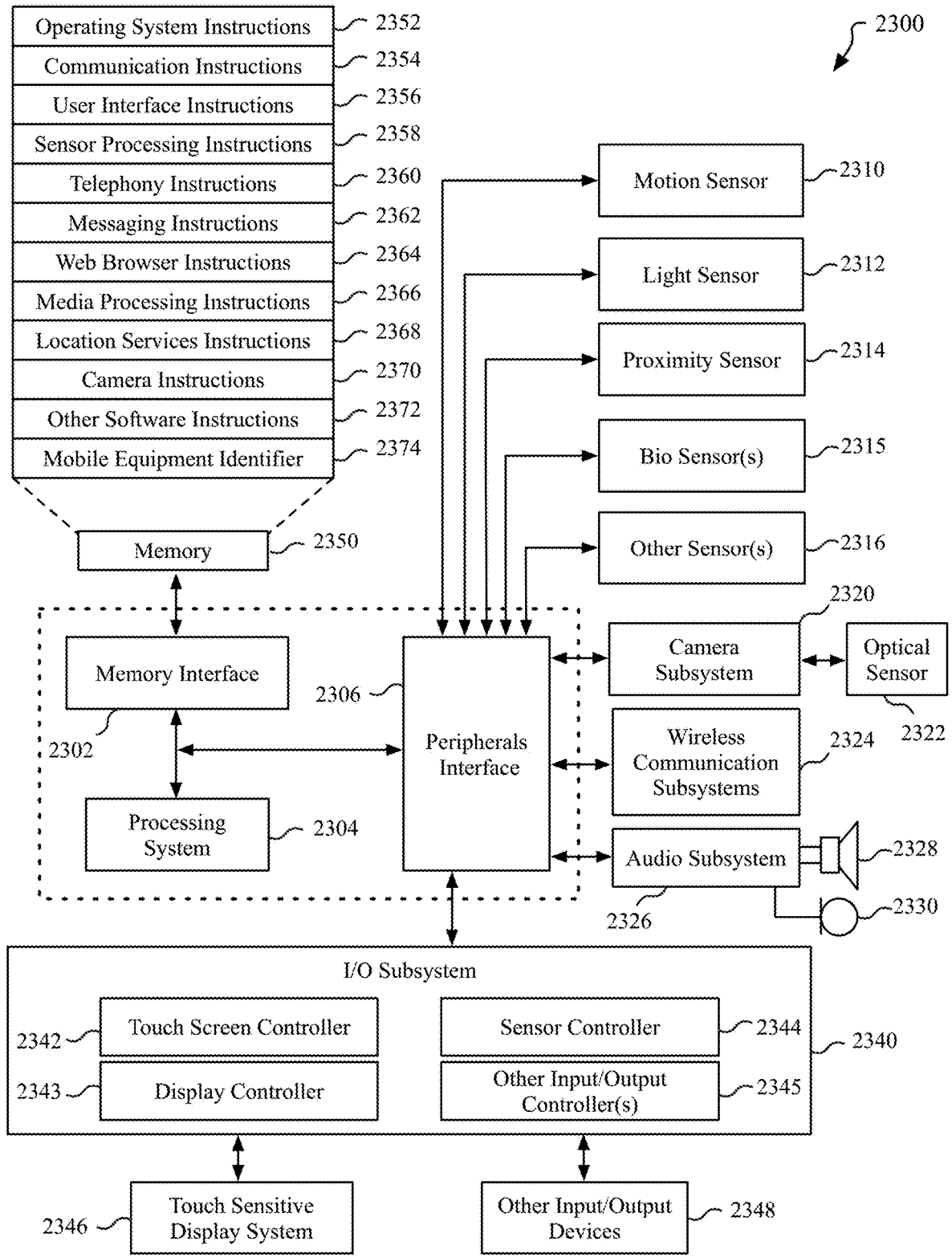
FIG. 23 is a block diagram of a device architecture for a mobile or embedded device, according to an embodiment.

FIG. 23 is a block diagram of a device architecture 2000 for a mobile or embedded device, according to an embodiment. The device architecture 2300 includes a memory interface 2302, a processing system 2304 including one or more data processors, image processors and/or graphics processing units, and a peripherals interface 2306. The various components can be coupled by one or more communication buses or signal lines. The various components can be separate logical components or devices or can be integrated in one or more integrated circuits, such as in a system on a chip integrated circuit.

The memory interface 2302 can be coupled to memory 2350, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 2306 to facilitate multiple functionalities. For example, a motion sensor 2310, a light sensor 2312, and a proximity sensor 2314 can be coupled to the peripherals interface 2306 to facilitate the mobile device functionality. One or more biometric sensor(s) 2315 may also be present, such as a fingerprint scanner for fingerprint recognition or an image sensor for facial recognition. Other sensors 2316 can also be connected to the peripherals interface 2306, such as a positioning system (e.g., GPS receiver), a temperature sensor, or other sensing device, to facilitate related functionalities. A camera subsystem 2320 and an optical sensor 2322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2324, which can include radio frequency receivers and transmitters and/or optical (e.g., infrared) receivers and transmitters. The specific design and implementation of the wireless communication subsystems 2324 can depend on the communication network(s) over which a mobile device is intended to operate. For example, a mobile device including the illustrated device architecture 2300 can include wireless communication subsystems 2324 designed to operate over a GSM network, a CDMA network, an LTE network, a Wi-Fi network, a Bluetooth network, or any other wireless network. In particular, the wireless communication subsystems 2324 can provide a communications mechanism over which a media playback application can retrieve resources from a remote media server or scheduled events from a remote calendar or event server.

An audio subsystem 2326 can be coupled to a speaker 2328 and a microphone 2330 to facilitate voice-enabled functions, such as voice recognition, voice replication, digital recording, and telephony functions. In smart media devices described herein, the audio subsystem 2326 can be a high-quality audio system including support for virtual surround sound.

The I/O subsystem 2340 can include a touch screen controller 2342 and/or other input controller(s) 2345. For computing devices including a display device, the touch screen controller 2342 can be coupled to a touch sensitive display system 2346 (e.g., touch-screen). The touch sensitive display system 2346 and touch screen controller 2342 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2346. Display output for the touch sensitive display system 2346 can be generated by a display controller 2343. In one embodiment, the display controller 2343 can provide frame data to the touch sensitive display system 2346 at a variable frame rate.

In one embodiment, a sensor controller 2344 is included to monitor, control, and/or processes data received from one or more of the motion sensor 2310, light sensor 2312, proximity sensor 2314, or other sensors 2316. The sensor controller 2344 can include logic to interpret sensor data to determine the occurrence of one of more motion events or activities by analysis of the sensor data from the sensors.

In one embodiment, the I/O subsystem 2340 includes other input controller(s) 2345 that can be coupled to other input/control devices 2348, such as one or more buttons, rocker switches, thumb-wheel, infrared port, USB port, and/or a pointer device such as a stylus, or control devices such as an up/down button for volume control of the speaker 2328 and/or the microphone 2330.

In one embodiment, the memory 2350 coupled to the memory interface 2302 can store instructions for an operating system 2352, including portable operating system interface (POSIX) compliant and non-compliant operating system or an embedded operating system. The operating system 2352 may include instructions for handling basic system services and for performing hardware dependent tasks. In some implementations, the operating system 2352 can be a kernel.

The memory 2350 can also store communication instructions 2354 to facilitate communicating with one or more additional devices, one or more computers and/or one or more servers, for example, to retrieve web resources from remote web servers. The memory 2350 can also include user interface instructions 2356, including graphical user interface instructions to facilitate graphic user interface processing.

Additionally, the memory 2350 can store sensor processing instructions 2358 to facilitate sensor-related processing and functions; telephony instructions 2360 to facilitate telephone-related processes and functions; messaging instructions 2362 to facilitate electronic-messaging related processes and functions; web browser instructions 2364 to facilitate web browsing-related processes and functions; media processing instructions 2366 to facilitate media processing-related processes and functions; location services instructions including GPS and/or navigation instructions 2368 and Wi-Fi based location instructions to facilitate location based functionality; camera instructions 2370 to facilitate camera-related processes and functions; and/or other software instructions 2372 to facilitate other processes and functions, e.g., security processes and functions, and processes and functions related to the systems. The memory 2350 may also store other software instructions such as web video instructions to facilitate web video-related processes and functions; and/or web shopping instructions to facilitate web shopping-related processes and functions. In some implementations, the media processing instructions 2366 are divided into audio processing instructions and video processing instructions to facilitate audio processing-related processes and functions and video processing-related processes and functions, respectively. A mobile equipment identifier, such as an International Mobile Equipment Identity (IMEI) 2374 or a similar hardware identifier can also be stored in memory 2350.

Each of the above identified instructions and applications can correspond to a set of instructions for performing one or more functions described above. These instructions need not be implemented as separate software programs, procedures, or modules. The memory 2350 can include additional instructions or fewer instructions. Furthermore, various functions may be implemented in hardware and/or in software, including in one or more signal processing and/or application specific integrated circuits.

Figure 24:
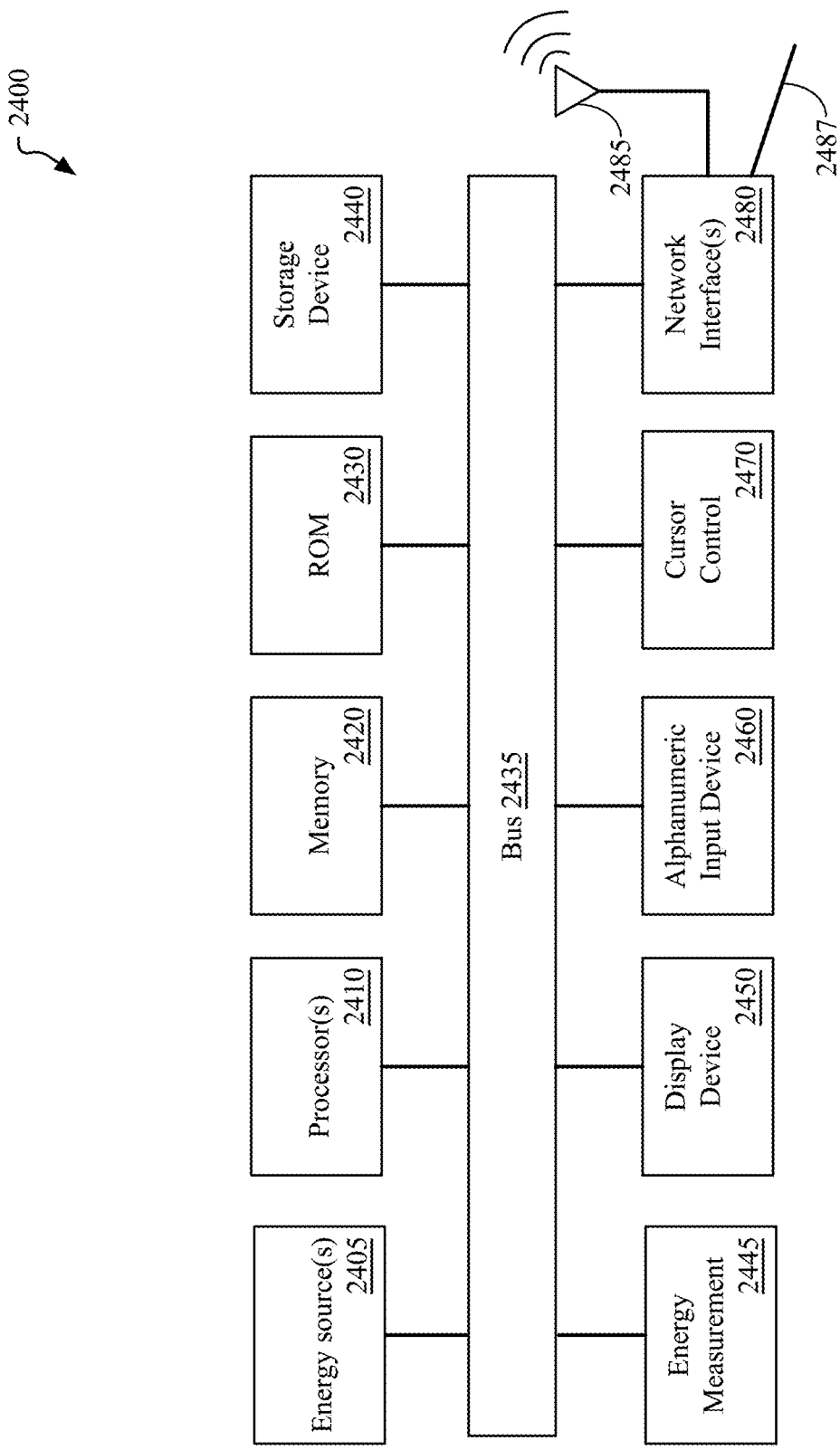
FIG. 24 is a block diagram of a computing system, according to an embodiment.

FIG. 24 is a block diagram of a computing system 2400, according to an embodiment. The illustrated computing system 2400 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2400 can be used to provide the computing device and/or a server device to which the computing device may connect.

The computing system 2400 includes bus 2435 or other communication device to communicate information, and processor(s) 2410 coupled to bus 2435 that may process information. While the computing system 2400 is illustrated with a single processor, the computing system 2400 may include multiple processors and/or co-processors. The computing system 2400 further may include memory 2420 in the form of random access memory (RAM) or other dynamic storage device coupled to the bus 2435. The memory 2420 may store information and instructions that may be executed by processor(s) 2410. The memory 2420 may also be main memory that is used to store temporary variables or other intermediate information during execution of instructions by the processor(s) 2410.

The computing system 2400 may also include read only memory (ROM) 2430 and/or another data storage device 2440 coupled to the bus 2435 that may store information and instructions for the processor(s) 2410. The data storage device 2440 can be or include a variety of storage devices, such as a flash memory device, a magnetic disk, or an optical disc and may be coupled to computing system 2400 via the bus 2435 or via a remote peripheral interface.

The computing system 2400 may also be coupled, via the bus 2435, to a display device 2450 to display information to a user. The computing system 2400 can also include an alphanumeric input device 2460, including alphanumeric and other keys, which may be coupled to bus 2435 to communicate information and command selections to processor(s) 2410. Another type of user input device includes a cursor control 2470 device, such as a touchpad, a mouse, a trackball, or cursor direction keys to communicate direction information and command selections to processor(s) 2410 and to control cursor movement on the display device 2450. The computing system 2400 may also receive user input from a remote device that is communicatively coupled via one or more network interface(s) 2480.

The computing system 2400 further may include one or more network interface(s) 2480 to provide access to a network, such as a local area network. The network interface(s) 2480 may include, for example, a wireless network interface having antenna 2485, which may represent one or more antenna(e). The computing system 2400 can include multiple wireless network interfaces such as a combination of Wi-Fi, Bluetooth®, near field communication (NFC), and/or cellular telephony interfaces. The network interface(s) 2480 may also include, for example, a wired network interface to communicate with remote devices via network cable 2487, which may be, for example, an Ethernet cable, a coaxial cable, a fiber optic cable, a serial cable, or a parallel cable.

In one embodiment, the network interface(s) 2480 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2480 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2400 can further include one or more energy sources 2405 and one or more energy measurement systems 2445. Energy sources 2405 can include an AC/DC adapter coupled to an external power source, one or more batteries, one or more charge storage devices, a USB charger, or other energy source. Energy measurement systems include at least one voltage or amperage measuring device that can measure energy consumed by the computing system 2400 during a predetermined period of time. Additionally, one or more energy measurement systems can be included that measure, e.g., energy consumed by a display device, cooling subsystem, Wi-Fi subsystem, or other frequently used or high-energy consumption subsystem.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. An electronic device comprising:
   a communications radio;
   an inertial sensor;
   a camera sensor;
   a display device;
   memory to store instructions; and
   one or more processors to execute the instructions, wherein the instructions cause the one or more processors to:
      determine one or more inertial displacement measurement values using the inertial sensor and received camera sensor data;
      determine a trajectory based on the one or more inertial displacement measurement values;
      receive a beacon signal from a target wireless device and determine at least one signal strength value from the beacon signal;
      estimate at least one proximity value to the target wireless device based on the at least one signal strength value corresponding to at least one position along the trajectory; and
      present an indicator of the at least one proximity value to the target wireless device along the trajectory in a user interface, wherein the trajectory represents a path taken by the electronic device.

2. The electronic device of claim 1, the one or more processors to execute the instructions, wherein the instructions further cause the one or more processors to:
   determine a category from a plurality of categories for signal strength values; and
   present the indicator of the proximity value in accordance with the determined category.

3. The electronic device of claim 1, the one or more processors to execute the instructions, the instructions further cause the one or more processors to:
   present the indicator of the proximity value on a two-dimensional heat map along the trajectory within the user interface.

4. The electronic device of claim 1, the one or more processors to execute the instructions, the instructions further cause the one or more processors to:
   present the indicator of the proximity value on a hexagonal grid.

5. The electronic device of claim 1, further comprising:
   a wireless controller including a ranging sensor, wherein the memory stores additional instructions that when executed by the one or more processors cause the one or more processors to:
      selectively present within the user interface at least one of a ranging view, a signal strength proximity view, or a ranging and signal strength proximity view, wherein presenting the ranging view comprises:
         determining a range and a direction to the target wireless device via the ranging sensor of the wireless controller during a bi-directional ranging operation; and
         determining a target position estimate for the target wireless device relative to the electronic device based on the range and direction to the target wireless device, and wherein
            presenting the ranging view comprises displaying at least one of the target position estimate for the target wireless device and an indicator for the direction to the target wireless device.

6. The electronic device of claim 5, wherein the selecting to present the ranging view is performed in response to establishing a wireless radio connection with the target wireless device.

7. The electronic device of claim 1, wherein the memory stores additional instructions that when executed by the one or more processors cause the one or more processors to:
   request, the target wireless device, increase a beaconing rate.

8. The electronic device of claim 5, wherein the bi-directional ranging operation performed via an ultra-wideband radio.

9. The electronic device of claim 5, wherein presenting the signal strength proximity view and the ranging view comprises presenting at least one indicator of the proximity value to the target wireless device and the indicator for the direction to the target wireless device along the trajectory in the user interface.

10. A non-transitory machine-readable medium storing instructions to cause one or more processors of an electronic device to perform operations comprising:
    determining one or more inertial displacement measurement values using an inertial sensor and received camera sensor data;
    determining a trajectory based on the one or more inertial displacement measurement values;
    receiving a beacon signal from a target wireless device and determine at least one signal strength value from the beacon signal;
    estimating at least one proximity value to the target wireless device based on the at least one signal strength value corresponding to at least one position along the trajectory; and
    presenting an indicator of the at least one proximity value to the target wireless device along the trajectory in a user interface, wherein the trajectory represents a path taken by the electronic device.

11. The non-transitory machine-readable medium of claim 10, wherein the non-transitory machine-readable medium includes additional instructions that when executed by the one or more processors of the electronic device cause additional operations comprising:
    determining a category from a plurality of categories for signal strength values; and
    presenting the indicator of the proximity value in accordance with the determined category.

12. The non-transitory machine-readable medium of claim 10, the operations additionally comprising:
    presenting the indicator of the proximity value on a two-dimensional heat map along the trajectory within the user interface.

13. The non-transitory machine-readable medium of claim 10, wherein the non-transitory machine-readable medium includes additional instructions that when executed by the one or more processors of the electronic device cause additional operations comprising:

presenting the indicator of the proximity value on a hexagonal grid.

14. The non-transitory machine-readable medium of claim 10, wherein the non-transitory machine-readable medium includes additional instructions that when executed by the one or more processors of the electronic device cause additional operations comprising: selectively presenting within the user interface at least one of a ranging view, a signal strength proximity view, or a ranging and signal strength proximity view, wherein presenting the ranging view comprises: determining a range and a direction to the target wireless device via a ranging sensor of a wireless controller during a bi-directional ranging operation; and determining a target position estimate for the target wireless device relative to the electronic device based on the range and direction to the target wireless device, and wherein presenting the ranging view comprises displaying at least one of the target position estimate for the target wireless device and an indicator for the direction to the target wireless device.

15. The non-transitory machine-readable medium of claim 14, wherein the selecting to present the ranging view is performed in response to establishing a wireless radio connection with the target wireless device.

16. The non-transitory machine-readable medium of claim 10, wherein the non-transitory machine-readable medium includes additional instructions that when executed by the one or more processors of the electronic device cause additional operations comprising:

requesting, the target wireless device, to increase a beaconing rate.

17. The non-transitory machine-readable medium of claim 14, wherein the bi-directional ranging operation is performed via an ultra-wideband radio.

18. The non-transitory machine-readable medium of claim 14, wherein presenting the signal strength proximity view and the ranging view comprises presenting at least one indicator of the proximity value to the target wireless device and the indicator for the direction to the target wireless device along the trajectory in the user interface.

19. A method comprising:

determining, by an electronic device, one or more inertial displacement measurement values using an inertial sensor and received camera sensor data;

determining, by the electronic device, a trajectory based on the one or more inertial displacement measurement values;

receiving, by the electronic device, a beacon signal from a target wireless device and determine at least one signal strength value from the beacon signal;

estimating, by the electronic device, at least one proximity value to the target wireless device based on the at least one signal strength value corresponding to at least one position along the trajectory; and presenting, by the electronic device, an indicator of the at least one proximity value to the target wireless device along the trajectory in a user interface, wherein the trajectory represents a path taken by the electronic device.

20. The method of claim 19, further comprising:

selectively presenting within the user interface at least one of a ranging view, a signal strength proximity view, or a ranging and signal strength proximity view, wherein presenting the ranging view comprises:

determining a range and a direction to the target wireless device via a ranging sensor of a wireless controller during a bi-directional ranging operation;

determining a target position estimate for the target wireless device relative to an electronic device based on the range and direction to the target wireless device; and presenting the ranging view comprises displaying at least one of the target position estimate for the target wireless device and an indicator for the direction to the target wireless device.

\* \* \* \* \*